(12) United States Patent
Bund et al.

(10) Patent No.: US 9,638,871 B2
(45) Date of Patent: May 2, 2017

(54) CONNECTOR FOR TELECOMMUNICATION ENCLOSURES

(71) Applicant: 3M INNOVATIVE PROPERTIES COMPANY, St. Paul, MN (US)

(72) Inventors: Christine B. Bund, Wuppertal (DE); Guy J. Barthes, Cluses (FR); Denis Dupont, St. Nazaire (FR); Christophe Desard, Herbignac (FR); Herve Brunet, St. Nazaire (FR); Enrique Frutos Fernández, Madrid (ES); Susana Lallena, Madrid (ES); Johann G. Hajok, Bochum (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/004,010

(22) Filed: Jan. 22, 2016

(65) Prior Publication Data

US 2016/0154184 A1 Jun. 2, 2016

Related U.S. Application Data

(63) Continuation of application No. 14/369,055, filed as application No. PCT/US2012/070816 on Dec. 20, 2012, now abandoned.

(Continued)

(51) Int. Cl.
*G02B 6/38* (2006.01)
*G02B 6/44* (2006.01)
(Continued)

(52) U.S. Cl.
CPC ............. *G02B 6/387* (2013.01); *G02B 6/245* (2013.01); *G02B 6/25* (2013.01); *G02B 6/3802* (2013.01);
(Continued)

(58) Field of Classification Search
CPC .............................. G02B 6/387; G02B 6/3887
See application file for complete search history.

(56) References Cited

U.S. PATENT DOCUMENTS

| 5,226,832 A | 7/1993 | Dejardin |
| 6,269,214 B1 | 7/2001 | Naudin et al. |
| (Continued) | | |

FOREIGN PATENT DOCUMENTS

| RU | 2402794 C1 | 10/2010 |
| WO | WO 2005-066674 | 7/2005 |
| (Continued) | | |

OTHER PUBLICATIONS

International Search Report for PCT International Application No. PCT/US2012/070816 mailed on Apr. 10, 2013, 4 pages.

*Primary Examiner* — Omar R Rojas
(74) *Attorney, Agent, or Firm* — Janet Kling

(57) ABSTRACT

A method of terminating an optical fiber drop cable with an optical fiber connector and said optical fiber connector are described herein wherein said optical fiber connector can be inserted into a port structure of a telecommunication enclosure to provide an environmentally sealed connection. The exemplary connector has a main body with an interior passageway extending from a first end to a second end of the main body and a compressible portion at the second end of the main body, a compression member attachable to the second end of the optical fiber connector over the compressible portion, an optical connection portion disposed at least partially within the interior, and an outer housing disposed over the connection portion wherein the outer housing has an external shape mateable with a standard format optical coupling.

14 Claims, 28 Drawing Sheets

Related U.S. Application Data

(60) Provisional application No. 61/586,135, filed on Jan. 13, 2012, provisional application No. 61/662,615, filed on Jun. 21, 2012, provisional application No. 61/718,979, filed on Oct. 26, 2012.

(51) Int. Cl.
*G02B 6/245* (2006.01)
*G02B 6/25* (2006.01)

(52) U.S. Cl.
CPC ......... *G02B 6/3821* (2013.01); *G02B 6/3825* (2013.01); *G02B 6/3861* (2013.01); *G02B 6/3887* (2013.01); *G02B 6/3897* (2013.01); *G02B 6/4452* (2013.01)

(56) References Cited

U.S. PATENT DOCUMENTS

| | | |
|---|---|---|
| 6,304,698 B1 | 10/2001 | Morris |
| 6,443,626 B1 | 9/2002 | Foster |
| 6,487,344 B1 | 11/2002 | Naudin et al. |
| 6,648,520 B2 | 11/2003 | McDonald et al. |
| 7,090,406 B2 | 8/2006 | Melton et al. |
| 7,357,579 B2 * | 4/2008 | Feldner ................ G02B 6/3887 385/56 |
| RE41,743 E | 9/2010 | Naudin et al. |
| 8,634,688 B2 | 1/2014 | Bryon et al. |
| 8,768,133 B2 | 7/2014 | Bryon et al. |
| 8,798,430 B2 | 8/2014 | Bryon et al. |
| 2008/0080817 A1 | 4/2008 | Melton et al. |
| 2009/0003777 A1 | 1/2009 | Feldner |
| 2011/0033157 A1 | 2/2011 | Drouard |
| 2011/0044588 A1 | 2/2011 | Larson et al. |
| 2011/0123157 A1 | 5/2011 | Belson et al. |
| 2013/0022317 A1 * | 1/2013 | Norris ................ G02B 6/3865 385/78 |

FOREIGN PATENT DOCUMENTS

| | | |
|---|---|---|
| WO | WO 2008-029072 | 3/2008 |
| WO | WO 2009-126411 | 10/2009 |
| WO | WO 2009-148797 | 12/2009 |
| WO | WO 2012-074688 | 6/2012 |

* cited by examiner

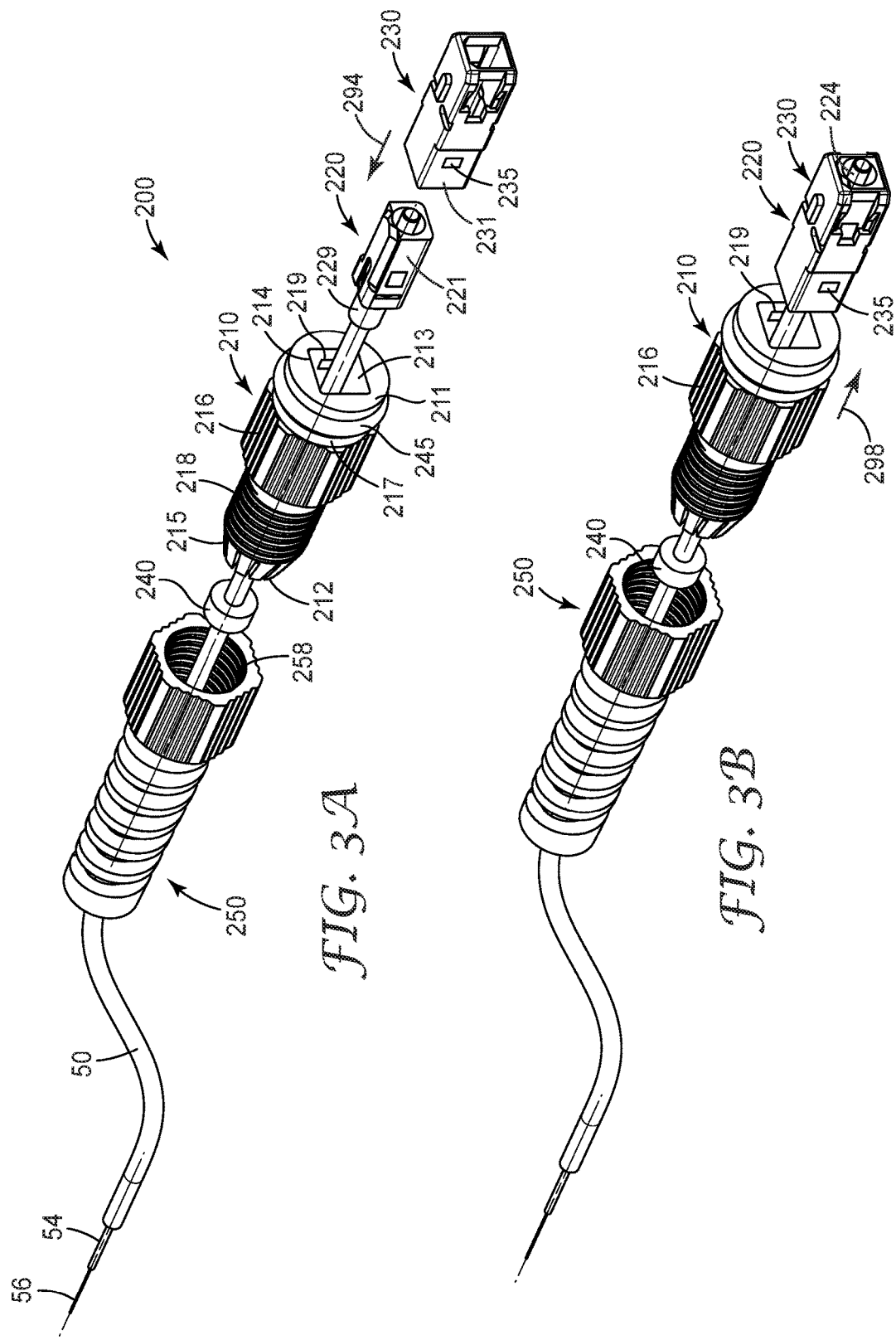

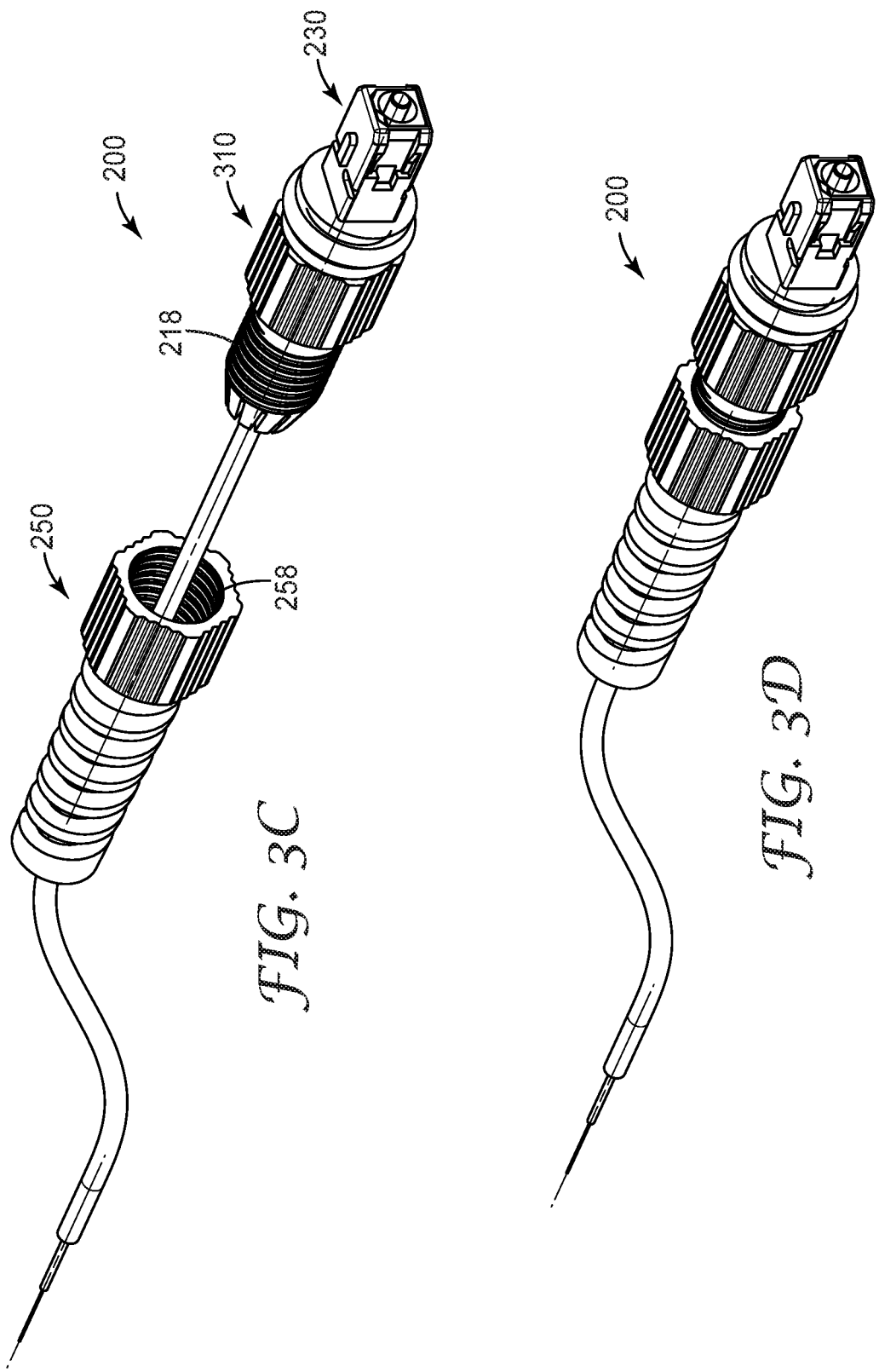

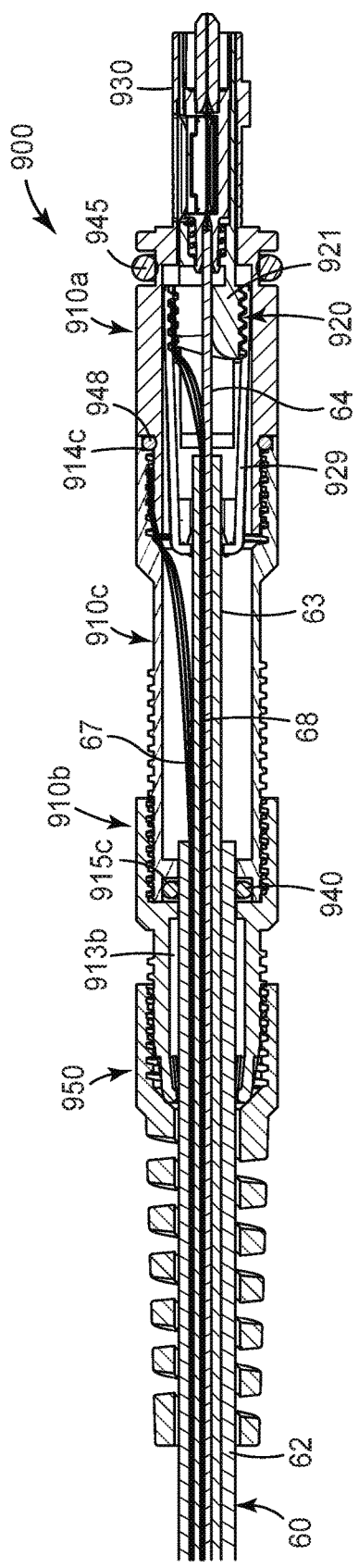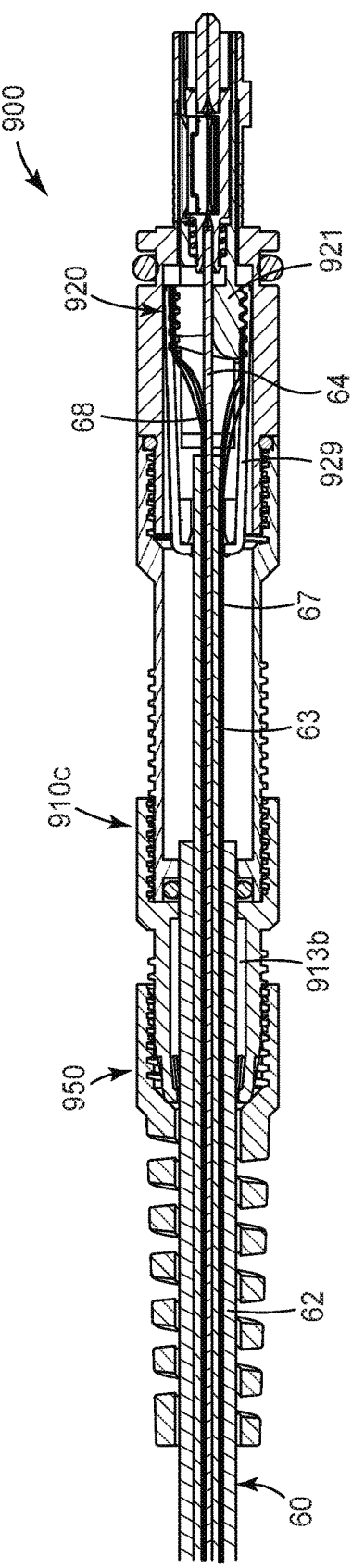

CONNECTOR FOR TELECOMMUNICATION ENCLOSURES

CROSS REFERENCE TO RELATED APPLICATIONS

This application is a continuation of U.S. patent application Ser. No. 14/3,690,559, filed Jun. 26, 2014, now pending, which is a national stage filing under 35 U.S.C. 371 of PCT/US2012/070816, filed Dec. 20, 2012, which claims priority to U.S. Provisional Application No. 61/586,135, filed Jan. 13, 2012; U.S. Provisional Application No. 61/662,615, filed Jun. 21, 2012; and U.S. Provisional Application No. 61/718,979, filed Oct. 26, 2012; the disclosures of which are incorporated by reference in its/their entirety herein.

FIELD OF THE INVENTION

The present invention relates to optical fiber connector for telecommunication enclosures. Specifically, the exemplary optical fiber connector can be plugged into a standard optical connector adapter through a port of the telecommunication enclosure.

BACKGROUND OF THE INVENTION

Telecommunication cables are ubiquitous and used for distributing all manner of data across vast networks. The majority of cables are electrically conductive cables (typically copper), although the use of optical fiber cables is growing rapidly in telecommunication systems as larger and larger amounts of data are transmitted. Additionally, as data transmissions increase, the fiber optic network is being extended closer to the end user which can be a premise, business, or a private residence.

As telecommunication cables are routed across data networks, it is necessary to periodically open the cable so that one or more telecommunication lines therein may be spliced, thereby allowing data to be distributed to other cables or "branches" of the telecommunication network. At each point where a telecommunication cable is opened, it is necessary to provide a telecommunication enclosure to protect the exposed interior of the cable. The cable branches may be further distributed until the network reaches individual homes, businesses, offices, and so on. These networks are often referred to as fiber to the X (FTTX) networks which can include fiber to the premise (FTTP), fiber to the home (FTTH) and fiber to the antenna (FTTA) networks.

In an FTTH network, optical fiber is brought to the end user and connected to the optical network terminal (ONT) unit mounted on a wall at the end user. The ONT converts this optical signal into conventional electrical signals to provide voice (telephone), Internet (data) and video signals to the end user.

Fiber terminals are one type of telecommunication enclosure that is typically located near an end user in a FTTP network to distribute the final service to the end user. Typical fiber terminals are designed to drop services (to provide service connections) to a small number of premises having typically between four to twelve end users. The last service connection from the fiber terminal is made to the ONT, located at the end user using a drop cable. Typically, an optical connector attached to the terminal end of an optical fiber of the cable is preferred to allow quick, reliable field installation.

There are two basic methods of introducing an optical fiber into a telecommunication or enclosure. In the first method, the cable passes through an inlet let device fitted into a port of the telecommunication enclosure. The optical connection interface is made within the enclosure by either an optical connector or an optical splice. Conventional watertight optical fiber connectors are described in U.S. Pat. No. 6,487,344 and U.S. Patent Publication No. 2011/0033157 which can be inserted into a port in the wall of a telecommunication enclosure.

The second method is to provide a weatherproof optical connection interface in or near a wall of the telecommunication using a sealed hardened connector that is factory mounted on the terminal end of an optical fiber cable and mating optical coupling mounted within a port or in the wall of the telecommunication enclosure, such as described in U.S. Pat. Nos. 6,648,520 and 7,090,406. This method has the advantage that service connections may be made without having to open the telecommunication enclosure in the field, but cleaning the optical interface and the need for specialized parts (e.g. the mating optical coupling) makes this approach less desirable.

SUMMARY OF THE INVENTION

An optical fiber connector is described herein for inserting a telecommunication cable into a telecommunication enclosure.

In a first exemplary embodiment, the optical connector is a field mountable optical fiber connector wherein the connector is designed to make an optical connection when it is inserted into a port structure of a telecommunication enclosure. The exemplary field mount connector has a main body with an interior passageway extending from a first end to a second end of the main body and a compressible portion at the second end of the main body, a compression member attached to the second end of the optical fiber connector over the compressible portion, and an optical connection portion disposed at least partially within the interior passageway and having an outer housing that has an external shape mateable with a standard format optical coupling.

In a second exemplary embodiment, the optical connector is a factory mountable optical fiber connector wherein the connector is designed to make an optical connection when it is inserted into a port structure of a telecommunication enclosure. The exemplary factory mount connector has a main body with an interior passageway extending from a first end to a second end of the main body and a compressible portion at the second end of the main body, a compression member attached to the second end of the optical fiber connector over the compressible portion, a optical connection portion disposed at least partially within the interior, and an outer housing disposed over the connection portion wherein the outer housing has an external shape that can be mated with a standard format optical coupling.

In a third exemplary embodiment, the optical connector can be either factory of field terminated and is designed to make an optical connection when it is inserted into a port structure of a telecommunication enclosure. The exemplary optical fiber connector has a main body having an interior passageway extending from a first end to a second end of the main body, a compression member attachable to the second end of the main body to compress an internal sealing member between the second end of the main body and the compression member; and an optical connection portion disposed at least partially within the interior passageway; and having an outer housing that has an external shape mateable with a standard format optical coupling.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIGS. 3A-3D show four views of a second embodiment of an exemplary optical fiber connector according to an aspect of the present invention;

FIGS. 14A-14D show four views of a ninth embodiment of an exemplary optical fiber connector according to an aspect of the present invention.

Figure 1A:
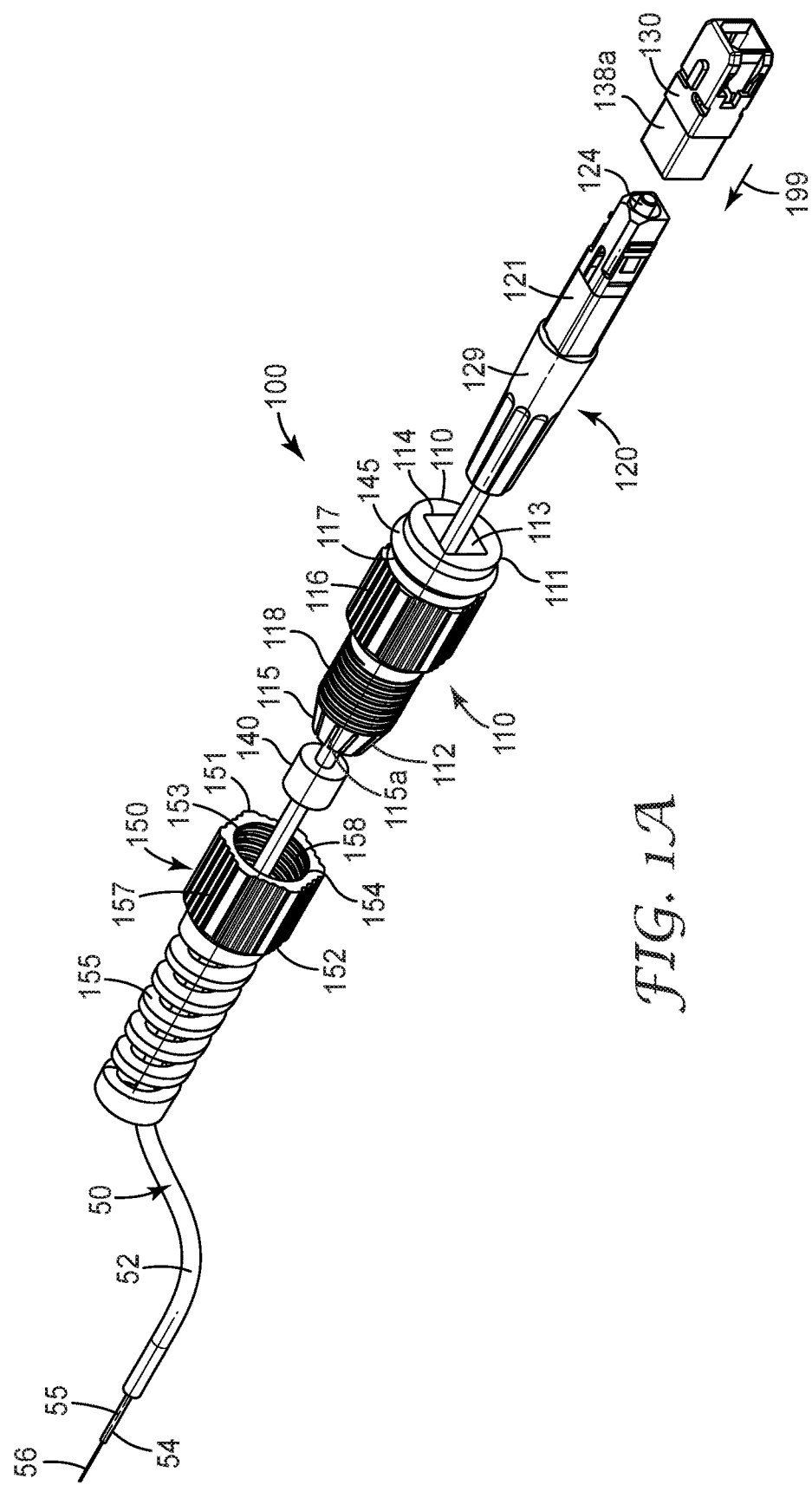
FIGS. 1A-1D show four views of a first embodiment of an exemplary optical fiber connector according to an aspect of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE DRAWINGS

In the following detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Exemplary embodiments herein provide an optical fiber connector for use in telecommunication enclosures. Specifically, the exemplary optical fiber connector can be plugged into a standard optical connector adapter through a port of the telecommunication enclosure. Particular advantages of the design of the present optical fiber connector include a lower cost than conventional hardened connectors which require a specialized mating optical coupling and field installable and factory installable versions of the exemplary optical fiber connector. The small size of the exemplary optical fiber connector allows more connections to be made in a similarly sized telecommunication enclosure as a result of a higher port density when compared to conventional ruggedized connector systems. In addition, the exemplary optical fiber connector can be easier to handle and faster to install than some conventional ruggedized connectors which require that the connector be screwed into a specialized receptacle in the port of a telecommunication enclosure.

The exemplary fiber optic connector can be used in FTTx optical fiber networks. In one exemplary aspect, the exemplary optical fiber connector can be used to connect an end user to a remote fiber terminal in a fiber to the premise network. In another aspect of the invention, the exemplary fiber optic connector can be used to connect an antenna on a cellular tower to equipment in a base station located at the foot of the tower.

The exemplary optical fiber connector may be fitted to the terminal end of a communication cable and inserted into a port in a telecommunication enclosure to provide an optical connection interface within the communication enclosure. Depending on the communication network architecture, the telecommunication enclosure may be a buried closure, an aerial closure or terminal, a fiber distribution hub or an optical network terminal in the outside plant or a wall mount communication box, fiber distribution hub, a wall mount patch panel, or an optical network terminal in premise applications. The exemplary fiber optic connector can provide an environmental seal when installed in a telecommunications enclosure. By providing an environmental seal, the inlet device can be designed to provide a watertight or water resistant seal and/or to prevent dust, bugs or any other foreign substance from entering the enclosure.

In one exemplary embodiment (see e.g. FIG. 1A), the telecommunication cable can be a fiber optic cable 50. The fiber optic cable typically includes a semi-rigid outer sheath or jacket 52 surrounding at least one optical fiber 54 and can include one or more strength members. The optical fibers may be enclosed in one or more loose buffer tubes or may be provided as one or more optical fiber ribbon cables. One to twelve optical fibers may reside in the loose buffer tube surrounded by a water-blocking gel or grease. Each of the ribbon cables may have from one to about twenty-four optical fibers. Each optical fiber has a polymeric coating 55 that surrounds and protects the glass fiber 56. Examples of exemplary optical fiber cables include ResiLink ADF™ All-Dielectric Flat Drop Cable available from Pirelli Cables and Systems (Columbia, N.C.) or EZ DROP cable from Draka (Claremont, N.C.), fiber reinforced plastic (FRP)

optical cable available from Shenzhen SDG Information Company, Ltd. (Shenzhen, China), SE*-LW* FTTH All Purpose Optical Drop Cables and SE-8 PureAccess™ Single Mode Optical Fiber each of which is available from Sumitomo Electric (Research Triangle Park, N.C.), Mini DP Flat Drop Cable available from OFS (Northcross, Ga.). The strength members may be either semi-rigid rods or a collection of loose fibers or floss, e.g. made of aramid fibers or glass.

In an alternative aspect, the communication cable can be an electrical cable in which case the connection portion of the exemplary connector will be an appropriate style of electrical connector such as an RJ-style plug connector, a USB connector or a coaxial connector, for example.

Referring to FIGS. 1A-1D, an exemplary optical fiber connector 100 includes a main body 110 having a first end 111 and a second end 112, a compression member 150 attachable to the second end of the main body and an optical connection portion 120 attachable to the first end of the main body. The compression member applies a radial force to the second end of the optical fiber connector's main body. The optical fiber connector 100 may be formed of plastic by conventional methods, for example by injection molding.

The main body 110 includes an internal sealing member 140 shaped to be received within the second end of the main body, and an external sealing member 145 disposed near the first end of the main body. The main body may be generally cylindrical in shape and includes an interior passageway 113 that extends along the length of the main body from the first end 111 to the second end 112 of the main body. The main body includes a passage entry 114 at the first end 111 of the interior passageway and a passage exit (not shown) at the second end 112 of the interior passageway 113 that may be configured to accommodate certain categories of telecommunication cables including single fiber drop cables and/or multi-fiber cables.

Figure 1B:
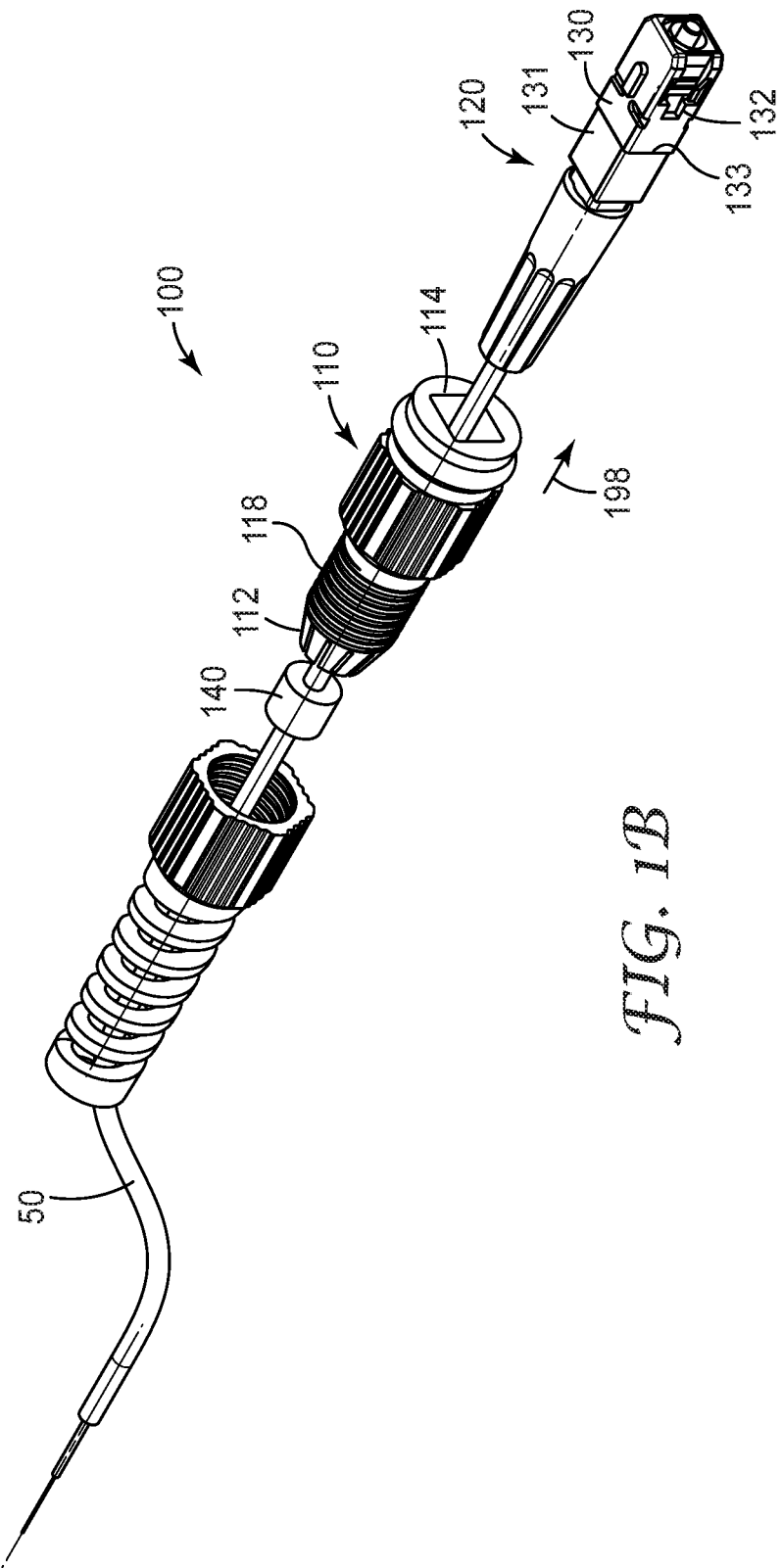

The passage entry 114 of the interior passageway 113 is configured to accept and secure optical connection portion 120 to/in the first end 111 of the main body. As such, the passage entry can be shaped to closely conform to an outer perimeter portion of the optical connection portion. As shown in FIGS. 1A and 1B, the passage entry has a rectangular opening configured to closely match the outer perimeter portion 131 of the outer housing 130 of optical connection portion 120. The opening of the passage entry can alternatively be circular, elliptical, oval, hexagonal or another polygonal shape.

In an exemplary aspect, the first end of the main body will reside inside the telecommunication enclosure when the optical fiber connector has been fully inserted into a port of a telecommunication enclosure, and the second end of the main body may be located within the port of the telecommunication enclosure when the optical fiber connector has been fully inserted into a port of a telecommunication enclosure. In another exemplary aspect, the second end of the main body can be disposed within the port structure of a telecommunication enclosure such that only a portion of the connection interface extends into the cavity of the enclosure. While in yet another embodiment, the standard telecommunication optical coupling can be mounted such that it partially extends into the port structure of the telecommunication enclosure resulting in the optical connection interface being proximate to the exit passageway of the port entry structure.

In an exemplary embodiment, the main body 110 can have a gripping surface 116 on the external surface of the main body. The external gripping surface may have a hexagonally shaped cross-section to facilitate gripping of the cable securing device with a tool or by hand. The gripping surface region may have other geometric configurations such as a cylindrical shape, a rectangular shape or other polygonal shape. Additionally, the gripping surface may be textured (e.g. a ridged or cross-hatched texture) to further facilitate gripping of the cable securing device.

A groove 117 may be located between external gripping surface 116 and the first end 111 of main body 110 to receive an external sealing member 145 such as an o-ring. This external sealing member can provide an environmental seal between the optical fiber connector and a port of a telecommunication enclosure when the optical fiber connector is fully seated therein. In an alternative aspect, the external sealing member and the main body of the optical connector can be formed using a 2K molding process.

The main body 110 can have an external threaded portion 125 located between external gripping surface 116 and the second end 112 of the main body. The external threaded portion 118 cooperates with a corresponding internal threaded portion 158 of compression member 150 to cause a compressible portion 115 of the main body 110 to conform to an outer surface of the communication cable fitted in the optical fiber connector. In an alternative aspect, the compression member may be attached to the second end of the main body by an interference fit or other mechanical attachment method.

The compressible portion 115 is formed at the second end 112 of the main body. The compressible portion 115 may be reduced in size (diameter) when an external radial force is exerted on it such as by application of compression member 150. The compressible portion 115 can have a plurality of spaced apart projections 115a extending from the main body near the second end thereof. In an exemplary aspect, each projection can have a barb (not shown) and/or a plurality of teeth (not shown) disposed near its interior end (i.e. the side of the projection that faces the interior passageway 113 of the main body). The barbs can penetrate the sheath of a telecommunication cable when compression member 150 is secured to the second end of the main body. The compression member can exert a radial force on the spaced apart projections 115a pushing them inward and pushing the barbs into sheath of the telecommunications cable.

In an exemplary aspect, the compressible portion 115 can gave a generally truncated conical shape with the compression member having a corresponding shape to cause the spaced apart projections to be squeezed together such that they exert a compressive force around the cable and/or internal sealing member seated in the interior passageway of the compression portion.

In one exemplary aspect, an internal sealing member 140 may be fitted into the interior passageway 113 in the compressible portion 115 of the main body 110 to improve the sealing and cable gripping capability of the optical fiber connector to a telecommunication cable as may be needed in buried, subterranean or other outdoor telecommunication enclosure installations. The telecommunication cable 50 passes through the internal sealing member 140 when the cable is installed into the optical fiber connector 100. The tightening of the compression member over the collapsible portion of the main body compresses the internal sealing member. Additionally, the gripping action of the internal sealing member on the cable can help secure connector portion 120 to main body 110 as will be described in more detail below.

In premise applications, such as insertion of cables into junction boxes within a building, an optical fiber connector may have reduced environmental sealing requirements. In these instances, the internal sealing member can be omitted. In this case, the compressible portion of the main body can directly grip the telecommunication cable inserted therethrough.

Compression member 150 has an interior chamber 153 extending between the first side 151 and a second side 152. The interior chamber 153 has a first opening 154 at the first end 151 to accept the second end 112 of main body 110. The chamber 153 has a smaller second opening (not shown) at the second end 152 of compression member 150 to accommodate the passage of a telecommunication cable therethrough. The chamber 153 has an internal threaded portion 158 that can correspond to the external thread 118 on the second end of the main body to allow the compression member to be secured to the main body of the optical connector.

In an exemplary embodiment, compression member 150 can have a gripping surface 157 on its external surface that corresponds to the position of the internal threaded portion 158. The external gripping surface may be a hexagonally shaped cross-section to facilitate gripping of the cable securing device with a tool or by hand. The gripping surface region may have other geometric configurations such as a circular cross-section, a rectangular cross-section or other polygonal cross-section. Additionally, the gripping surface may be textured (e.g. a ridged or cross-hatched texture) to further facilitate gripping of the cable securing device.

In addition, compression member 150 can include an integral bend control boot 155 disposed on the second end 152 of the compression member. The bend control boot prevents the telecommunication cable from exceeding its minimum bend radius which could result in degradation of the signal being carried on the telecommunication cable. In an alternative aspect, a compression member that does not include a bend control boot can be used with low bend radius cables or bend resistant cables. Examples of compression members that do not include bend control boots can be found in FIGS. 4A, and 4C-4E of commonly owned U.S. Patent Publication No. 2011/0033157, incorporated herein by reference.

Optical connection portion 120 of the exemplary optical fiber connector can be secured to the first end 111 of main body 110. In the exemplary embodiment shown in FIGS. 1A-1D, the combination of optical connection portion 120 and outer housing 130 can be a field mountable fiber optic connector. Utilizing a field mountable fiber optic connector in optical connector 100 allows for a sealed optical connection to be made by plugging optical connector 100 into a standard optical connector adapter through a port of the telecommunication enclosure. An exemplary field mountable fiber optic connector is described in commonly owned U.S. Patent Publication No. 2011/0044588, incorporated herein by reference in its entirety.

Field mountable fiber optic connector useable as the connection portion with exemplary connector 100 includes an outer housing 130 that is configured to mate with a standard optical coupling, a backbone 121 to retain a collar body (not shown) within the outer housing, and a boot 129. Field mountable fiber optic connector (i.e. outer housing) is configured as having an SC format. However, as would be apparent to one of ordinary skill in the art given the present description, optical connection portions (i.e. the outer housings and corresponding internal components of standard optical fiber connectors) having other standard formats, such as MT, MPO, ST, FC, and LC connector formats, can also be used with the exemplary connector structure described herein and are considered to be within the scope of the present disclosure.

The collar body includes a fiber stub secured in ferrule 124 by an epoxy or other suitable adhesive, and a mechanical splice device. The ferrule can be formed from a ceramic, glass, plastic, or metal material to support the optical fiber stub inserted and secured therein. In a preferred aspect, ferrule 124 is a ceramic ferrule. The optical fiber stub is inserted through ferrule 124, such that a first fiber stub end slightly protrudes from or is coincident or coplanar with the end face of the ferrule. Preferably, this first fiber stub end is factory polished (e.g., a flat or angle-polish, with or without bevels). A second end of the fiber stub extends part-way into the interior of the connector 100 and is spliced to the terminal end of optical fiber 56 of an optical fiber cable (such as optical fiber cable 50). Preferably, the second end of the fiber stub can be cleaved (flat or angled, with or without bevels). The fibers stub can comprise standard single mode or multimode optical fiber, such as SMF 28 (available from Corning Inc.). Ferrule 124 can be secured to the collar body via an epoxy or other suitable adhesive.

The splice device is held within a splice element housing portion of the collar body. In an exemplary embodiment, splice device can be a mechanical splice device (also referred to as a splice), such as a 3M™ FIBRLOK™ mechanical fiber optic splice device, available from 3M Company, of Saint Paul, Minn.

The backbone can include a fiber jacket clamping portion to clamp a jacket portion that surrounds a portion of the terminated optical fiber upon actuation. The boot can actuate the fiber jacket clamping portion of the backbone upon attachment to the backbone. The optical fiber connector can be terminated in the field without the need to use a separate termination platform or tool.

Exemplary optical fiber connector 100 is assembled by first sliding compression member 150, the internal sealing member 140 and boot 129 over the fiber cable 50 for later use.

Optical connection portion 120 can be mounted onto the terminal end of optical fiber cable 50 by a method that is analogous to the assembly method of the field mountable connector described in U.S. Patent Publication No. 2011/0044588 with the exception that outer housing is not attached to the backbone at this point in time.

Optical connection portion 120 can be partially pre-assembled such that the collar body with ferrule 124 secured therein is held within backbone 121. This step may be performed prior to the field termination process or during the field termination process.

For field termination, optical fiber cable 50 is prepared by cutting of a portion of the fiber cable jacket 52 and stripping off a coated portion 55 of the optical fiber 54 near the terminating fiber end to leave a bare glass fiber portion 56 and cleaving (flat or angled) the fiber end to match the orientation of the pre-installed fiber stub. In an exemplary aspect, about 50 mm of the jacket 52 can be removed, leaving about 25 mm of stripped fiber. For example, a commercial fiber cleaver such as an Ilsintech MAX CI-01 or the Ilsintech MAX CI-08, available from Ilsintech, Korea (not shown) can be utilized to provide a flat or an angled cleave. No polishing of the fiber end is required, as a cleaved fiber end can be optically coupled to the fiber stub in the splice device. The prepared end of optical fiber cable 50 is inserted through the rear end of the backbone 121 of the partially pre-assembled optical connection portion. In this manner, the prepared fiber end can be spliced to the fiber stub with the mechanical splice device housed in the collar body within backbone 121. The fiber cable 50 is continually inserted until the coated portion 55 of the fiber begins to bow (which occurs as the end of fiber 56 meets the fiber stub with sufficient end loading force). The splice device is actuated while the fibers are subjected to an appropriate end loading force. The fiber jacket can then be released, thereby removing the fiber bow.

The boot 129 (which is previously placed over fiber cable 50) is then pushed axially toward the backbone 121 and screwed onto the backbone mounting section to secure the boot in place to complete the mounting of exemplar optical connection portion 120 onto optical fiber cable 50.

Next, optical connection portion 120 is slid through interior passage way 113 of main body 110. Outer housing 130 is snapped on the front end of the backbone 121 of optical connection portion 120 by sliding in a direction indicated by arrow 199 until the outer housing is secured in place as shown in FIG. 1B. In an alternative aspect, the main body of the connector can be threaded onto the optical cable before the optical connection portion is mounted on the terminal end of the optical fiber.

Figure 1C:
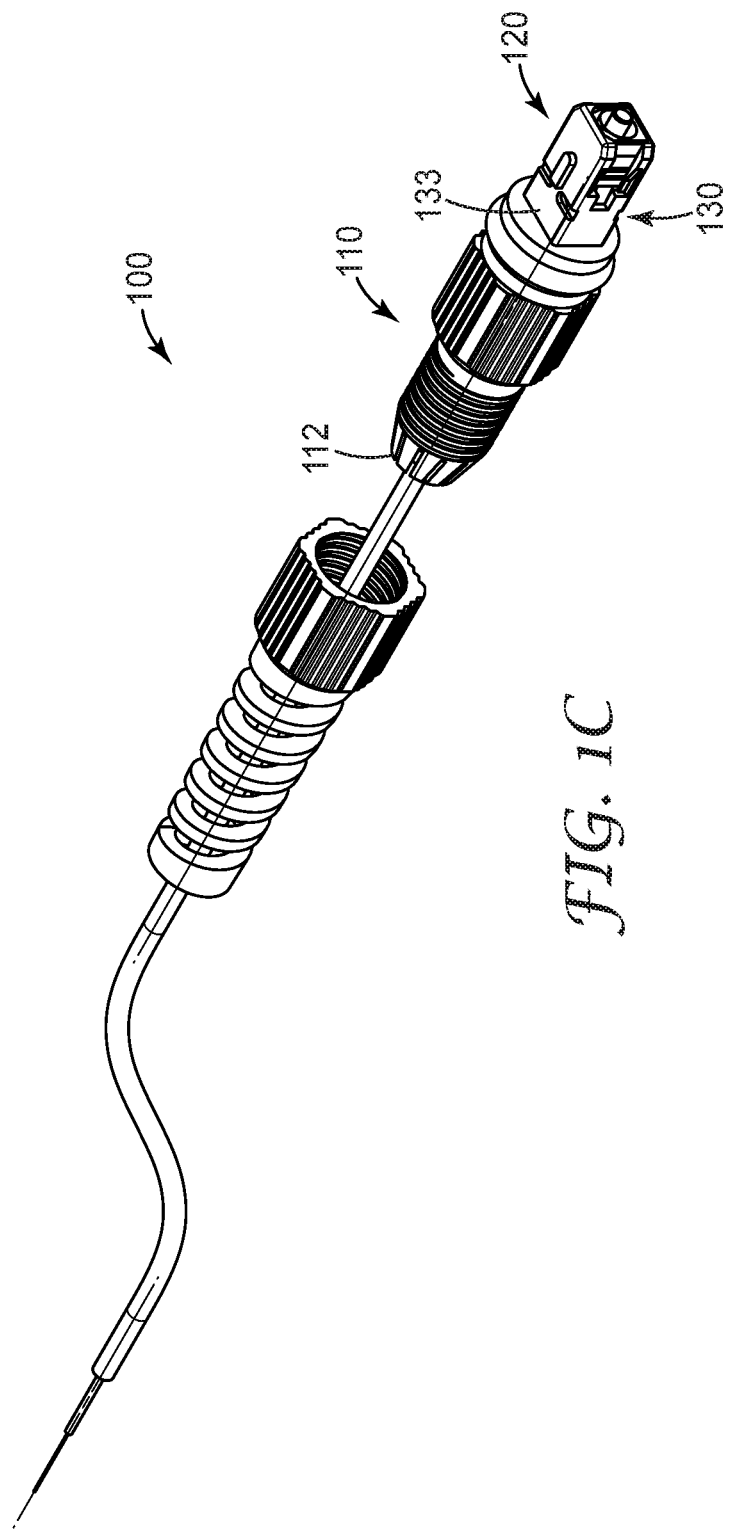

The main body 110 of optical connector 100 is slid along optical fiber cable in a direction indicated by arrow 198 until a lip 133 the outer housing 130 abuts against passage entry 114 of the main body 110 as shown in FIG. 1C.

Figure 1D:
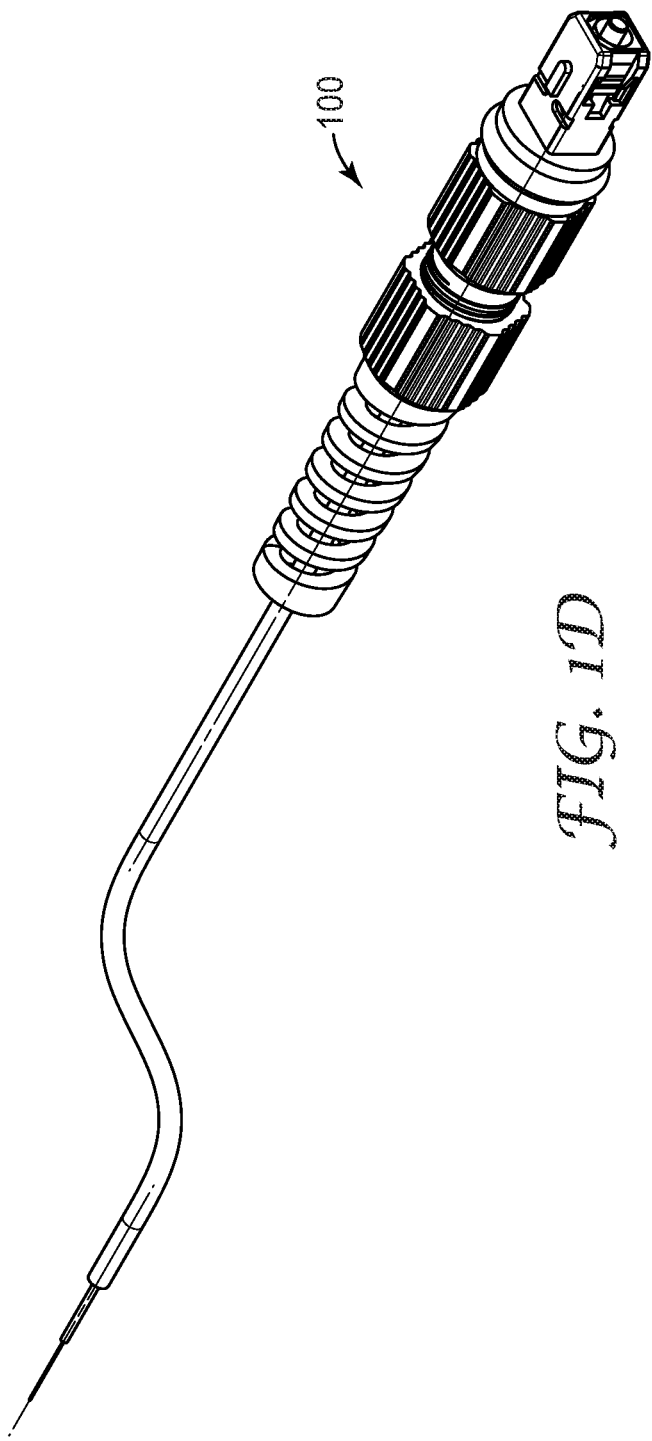

The internal sealing member is pushed along optical fiber cable 50 and slid into the second end 112 of the main body and the compression portion is slid forward and compression member 150 is secured to the main body by engaging internally threaded portion 158 of the compression member with the corresponding external thread portion 118 on the second end 112 of the main body 110 to yield the fully assembled optical connector 100 as shown in FIG. 1D. The tightening of the compression member 150 over the collapsible portion of the main body compresses the internal sealing member which anchors the main body between the lip of the outer shell of connector portion 120 and the internal sealing member gripping the cable within the main body. In an alternative embodiment, the optical connection portion can be adhesively connected to the main body or mechanically secured to the main body.

Field mountable optical connector 100 can advantageously allow the length of the optical fiber cable to be adjusted in the field to avoid waste and the need to store excess lengths of unneeded cable.

Figure 2A:
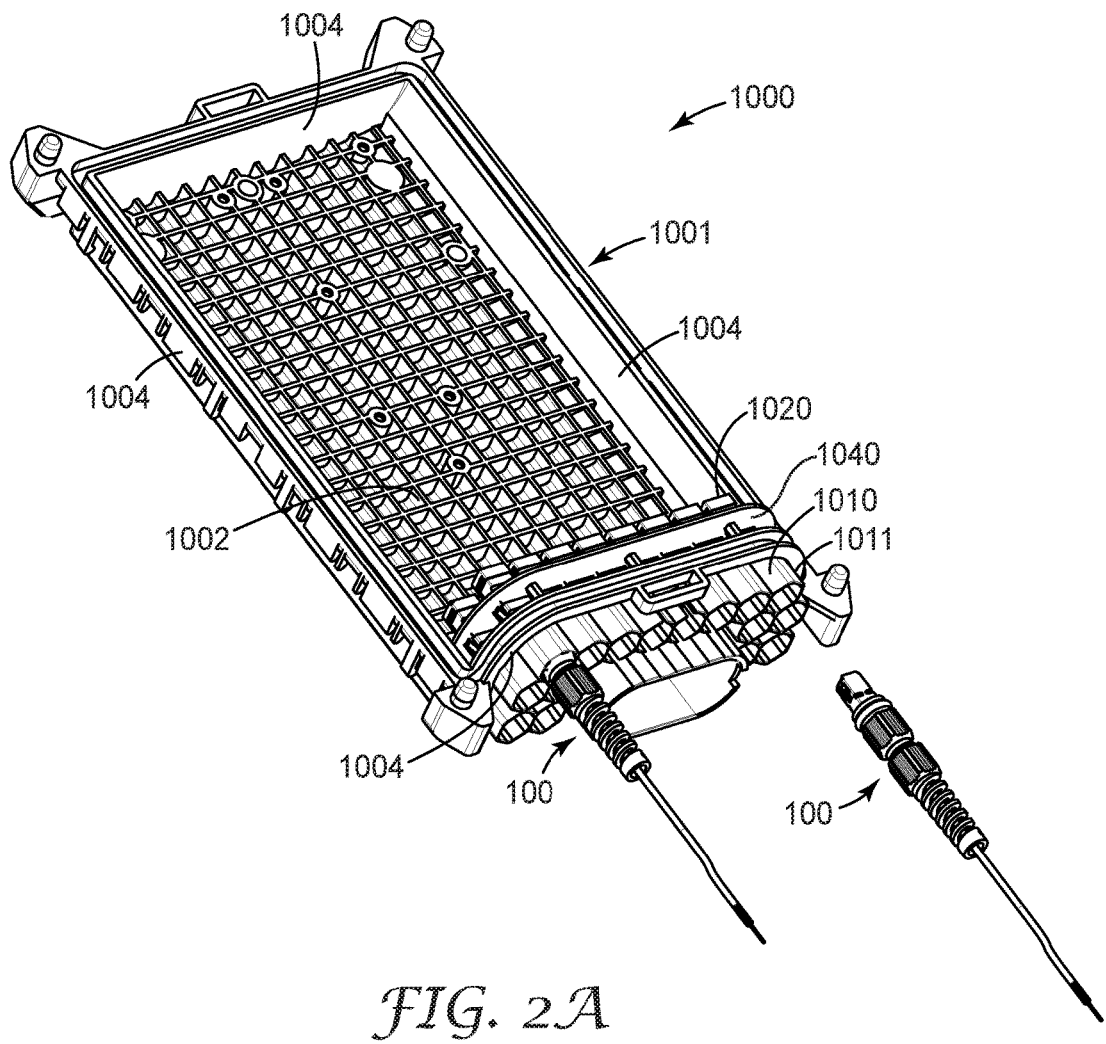
FIGS. 2A-2B show the exemplary optical fiber connector of the present invention plugged into a standard optical connector adapter through a port of the telecommunication enclosure.
Figure 2B:
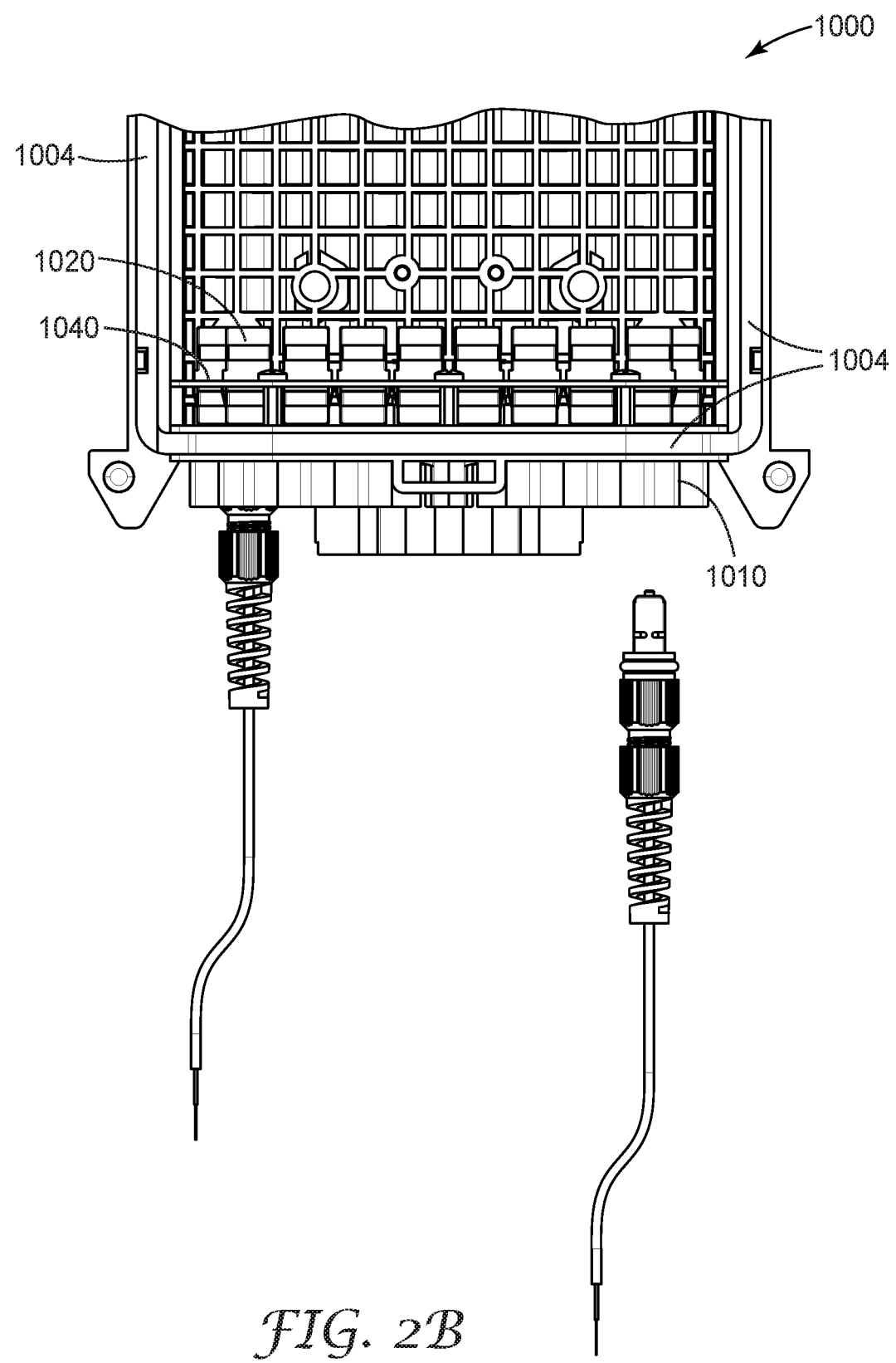

FIGS. 2A and 2B are two views showing the securing the exemplary optical fiber connector 100 into a standard optical connector coupling 1020 within a portion of a telecommunication enclosure 1000 when the optical connector is inserted through a port of the enclosure. The telecommunication enclosure can be a terminal enclosure such as BPEO S1 16 S7 (Stock number N501714A) available from 3M Company (St. Paul, Minn.).

The exemplary terminal closure 1000 of FIGS. 2A and 2B includes a base 1001 and a cover or main body (not shown) removably securable to the base. The base of the telecommunication enclosure shown in the figures includes a bottom wall 1002 and a plurality of side walls 1004 extending approximately perpendicularly from the bottom wall and adjoined to one another at the corners of the enclosure. At least one of the side walls can include at least one port structure 1010 for receiving a fiber optic connector of the present invention. The exemplary port structure can be a hexagonal port structure having an exterior portion 1011 disposed outside of the enclosure. The exemplary port structure can have other geometric configurations such as a generally cylindrical or tubular shape, a rectangular shape or other polygonal shape.

When optical connector 100 is fully inserted into the port structure 1010, the external sealing member 145 of the optical connector provides a water tight seal between the internal circumference of the port structure and the optical connector. The internal sealing member housed within the main body of the connector provides a seal between the main body of the connector and the optical fiber cable passing therethrough.

A standard telecommunication optical coupling 1020 can be attached to a standard patch panel 1040 anchored to the back wall 1002 of the telecommunication enclosure 1000 by a mechanical fastener (not shown) or other anchoring mechanism. The patch panel is disposed proximate to the side wall 1004 with the port structures 1010. The standard optical couplers are mounted in the patch panel such that they align with the port structures of the enclosure allowing an optical connection to be made when optical connector 100 is fully inserted into the port structure.

An exemplary factory mountable optical fiber connector 200 is shown in FIGS. 3A-3D. Optical fiber connector 200 is similar to the main body of the field mountable optical fiber connector 100 (FIGS. 1A-1D) described previously, except that the optical connection portion 220 comprises a factory mounted optical connection portion. Optical fiber connector 200 includes a main body 210 having a first end 211 and a second end 212, a compression member 250 attachable to the second end of the main body and an optical connection portion 220 attachable to the first end of the main body. The compression member applies a radial force to the second end of the optical fiber connector main body. The optical fiber connector 200 may be formed of plastic by conventional methods, for example by injection molding.

The main body includes an internal sealing member 240 shaped to be received within the second end of the main body, and an external sealing member 245 disposed near the first end of the main body. The main body may be generally cylindrical in shape and includes an interior passageway 213 that extends from a passage entry 214 at the first end 211 of the main body to a passage exit (not shown) at the second end 212 of the main body. The passage entry 214 is configured to accept and secure optical connection portion 220 to/in the first end 211 of the main body. As such, the passage entry can be shaped to closely conform to an outer perimeter portion 231 of the optical connection portion. As shown in FIGS. 3A and 3B, the passage entry has a rectangular opening configured to closely match the outer perimeter portion 231 of the outer housing 230 of optical connection portion 220. The opening of the passage entry can alternatively be circular, elliptical, oval, hexagonal or another polygonal shape.

In addition, one or more catches 219 can be disposed within interior passageway 213. The catches which engage with openings or detents 235 on the outer housing 230 to secure the optical connection portion 220 to the first end 211 of main body 210 of optical connector 200 when the optical connection portion is disposed in the outer housing.

In an exemplary embodiment, the main body 210 can have a gripping surface 216 on the external surface of the main body. The gripping surface may be textured (e.g. a ridged or cross-hatched texture) to further facilitate gripping of the cable securing device.

An external sealing member 245 can be disposed in a groove 217 in the main body external gripping surface 216 and the first end 211 of main body 210. This external sealing member can provide an environmental seal between the optical fiber connector and a port of a telecommunication enclosure when the optical fiber connector is fully seated therein.

The main body 210 can further include an external threaded portion 218 located between external gripping surface 216 and the second end 212 of the main body 210. The external threaded portion 218 cooperates with a corresponding internal threaded portion 258 of a compression member 250, which is analogous to compression member 150 shown in FIGS. 1A-1D. The compression member causes compressible portion 215 of the main body 210 to conform to an outer surface of the communication cable and/or the internal sealing member when the compression member is secured to the main body.

The optical connection portion 220 of exemplary optical fiber connector 200 can be a factory mounted fiber optic connector body 221 that is secured to the terminal end of fiber optic cable 50. For example, optical connection portion 220 is configured to engage with an SC format outer housing 230. However, as would be apparent to one of ordinary skill in the art given the present description, optical connection portion and the outer housings could be configured to have other standard formats, such as MT, MPO, ST, FC, and LC connector formats.

Exemplary optical fiber connector 200 is assembled by first sliding compression member 250 and the internal sealing member 240 over the fiber optic cable 50 for later use.

The terminal end of the optical fiber cable is stripped and cleaved to reveal the bare glass portion 56 of optical fiber 54. This prepared end of the optical fiber cable can be inserted into the fiber optic connector body 221 of optical connection portion 220 until the terminal end of the bare glass portion extend beyond the end face of ferrule 224. The optical fiber can be adhesively or mechanically secured in fiber optic connector body 221. The excess length of fiber protruding from the end face of the fiber is removed. The end face of the fiber can be finished using a standard factory polish technique (e.g., a flat or angle-polish, with or without bevels).

A mini-boot 229 is attached to the back end of the fiber optic connector body 221 to facilitate handling of the optical connection portion 220 through the remainder of the optical connector assembly process.

Next, optical connection portion 220 is slid through interior passage way 213 of main body 210. Outer housing 230 is snapped on the front end of the fiber optic connector body 221 of optical connection portion 220 by sliding in a direction indicated by arrow 294 until the outer housing is secured in place as shown in FIG. 1B. Alternatively, the main body can be pre-threaded onto the optical fiber cable prior to the mounting of the optical connection portion onto the terminal end of the optical fiber.

The main body 210 of optical connector 200 is slid along optical fiber cable in a direction indicated by arrow 298 until the catches 219 within the interior passageway 213 engage with the detents 235 on the outer housing 230 of the optical connection portion 220.

The internal sealing member is pushed along optical fiber cable 50 and slid into the second end 212 of the main body and compression member 250 is secured to the main body by engaging internally threaded portion 258 of the compression member with the corresponding external thread portion 218 on the second end 212 of the main body 210 to yield the fully assembled optical connector 200 as shown in FIG. 3D. The tightening of compression member 250 over the collapsible portion of the main body compresses the internal sealing member and secures the main body to the sheath of the optical fiber cable 50.

In another aspect of the current invention, the main body and compression member of the present invention can be used with a factory prepared pre-terminated optical fiber cable having a standard factory mounted optical connector (e.g. a SC connector, and LC connector, and FC connector, etc.). In this aspect, the standard factory mounted optical connector is analogous to combination of (the optical connection portion with the outer housing attached). The outer housing can be removed from the connection portion so that the connection portion can be fed through the compression member and the main body. The outer housing is then reattached over the connection portion and the main is slid forward until a lip on the outer housing abuts against the passage entry of the main body. An internal sealing member having a longitudinal slit can be slipped over the cable and slid into the second end of the main body. The compression member is attached over the second end of the main body to yield an optical fiber connector of the current invention.

Figure 4:
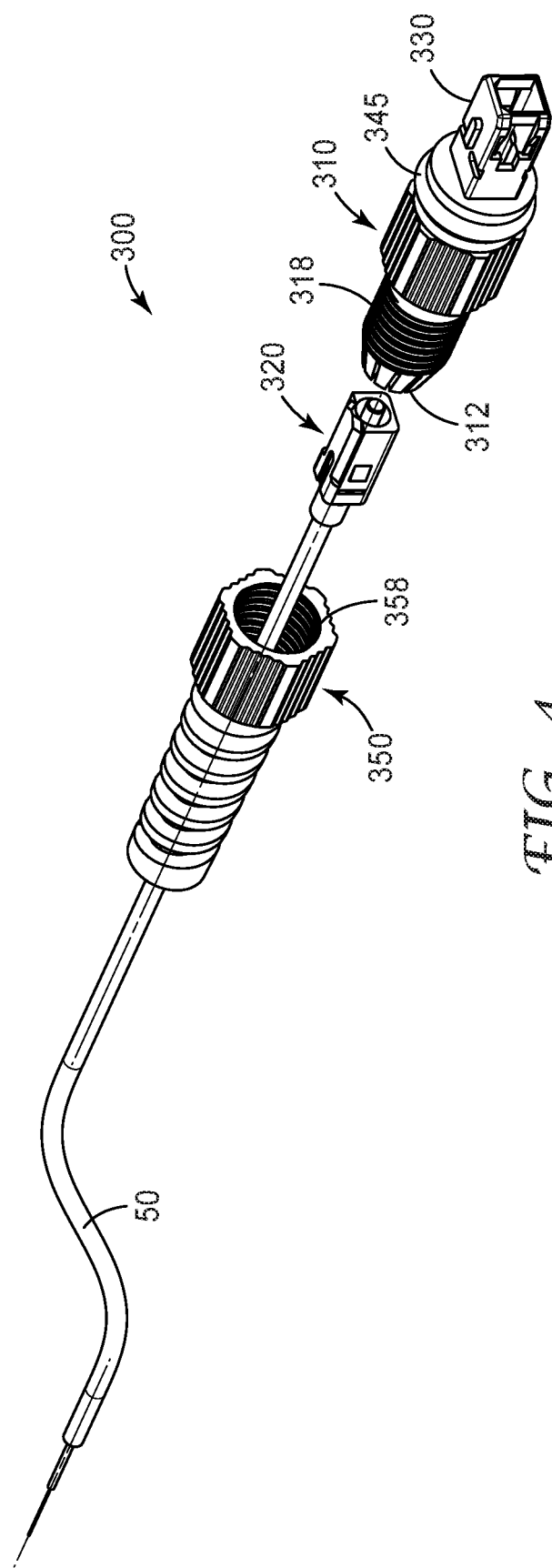
FIG. 4 shows a view of a third embodiment of an exemplary optical fiber connector according to an aspect of the present invention.

FIG. 4 shows another embodiment of an exemplary factory mountable optical fiber connector 300. Optical fiber connector 300 is similar to factory mounted optical fiber connector 200 (FIGS. 3A-3D) described previously, except that in this embodiment the outer housing 330 is integrally formed with main body 310.

Connector 300 is assembled by first sliding compression member 350 and the internal sealing member, if used, over the fiber optic cable 50 for later use.

Optical connection portion 320 is mounted onto optical fiber cable in a method similar to that described with respect to optical fiber connector 200.

Next, optical connection portion 320 is slid through interior passage way (not shown in FIG. 4) of main body 310 and snapped in to outer housing 330 which is integrally formed on the first end of the main body.

Compression member 350 is slid forward and secured to the main body by engaging internally threaded portion 358 of the compression member with the corresponding external thread portion 318 on the second end 312 of the main body 310 to yield the fully assembled optical connector 300.

The integrally formed main body and outer housing can also be utilized with a field mount connector similar to that shown in FIG. 1A-1D to reduce the number of parts that the field technician has to keep of track when installing the connector in the field.

Figure 5:
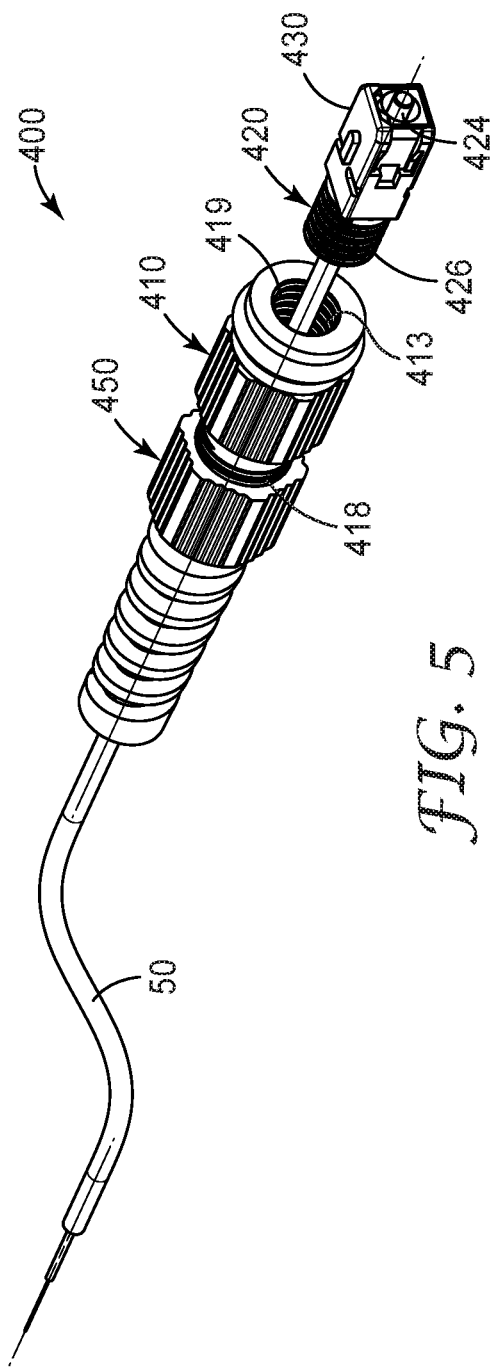
FIG. 5 shows a view of a forth embodiment of an exemplary optical fiber connector according to an aspect of the present invention.

In FIG. 5, alternative connector 400 includes an optical connection portion 420 that can be threadably engaged with main body 410. Optical connector 400 has a shorter outer housing 430 which leaves a portion of optical connection portion 420 opposite the ferrule 424 exposed. The exposed portion of the optical connection portion 420 has an external thread 426 disposed on the end opposite ferrule 424. The external thread on the exposed portion of the optical connection portion is configured to engage with an internal thread 419 disposed in the interior passageway 413 that extends through the main body.

In this embodiment, the compression member 450, the internal sealing member, if used, and main body are slid over the fiber cable 50 before terminating the optical fiber cable. The cable is prepared and the optical connection portion can be mounted on the fiber by either adhesively or mechanically securing the optical fiber within the optical connection portion. The end face of fiber can be factory polished with either a flat or beveled finish.

The main body 410 is moved forward over the back end of the optical connection portion 420 until the threads 419 within the interior passageway 413 of the main body engage with the external threads 426 of the optical connection portion. The main body can then be screwed onto the optical connection portion until it is securely engaged. Next, the internal sealing member, if used, can be slid into the second end of the main body and the compression portion is slid forward and compression member 450 is secured to the main body by engaging internally threaded portion of the compression member with the corresponding external thread portion 418 on the second end of the main body 410 to yield the fully assembled optical connector 400.

Figure 6A:
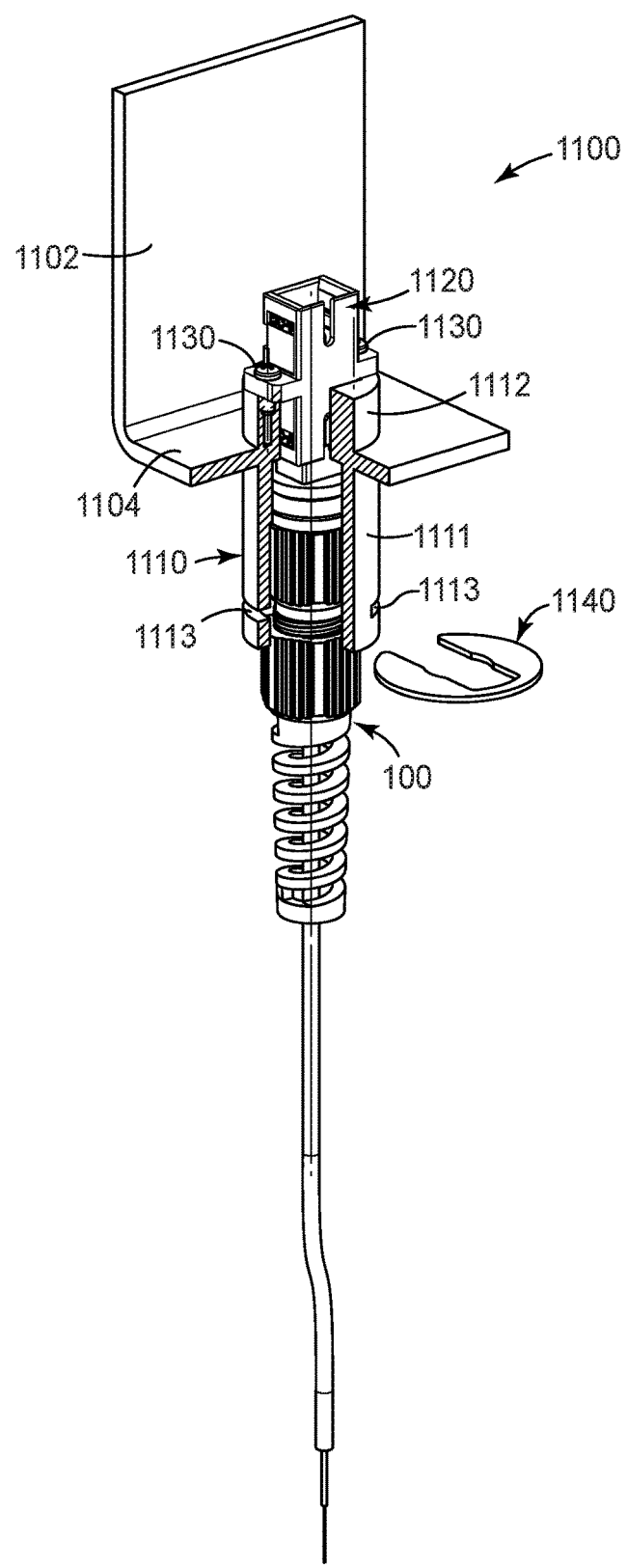
FIG. 6A and 6B shows a method of securing the exemplary optical fiber connector of the present invention into a standard optical connector adapter through a port of the telecommunication enclosure.
Figure 6B:
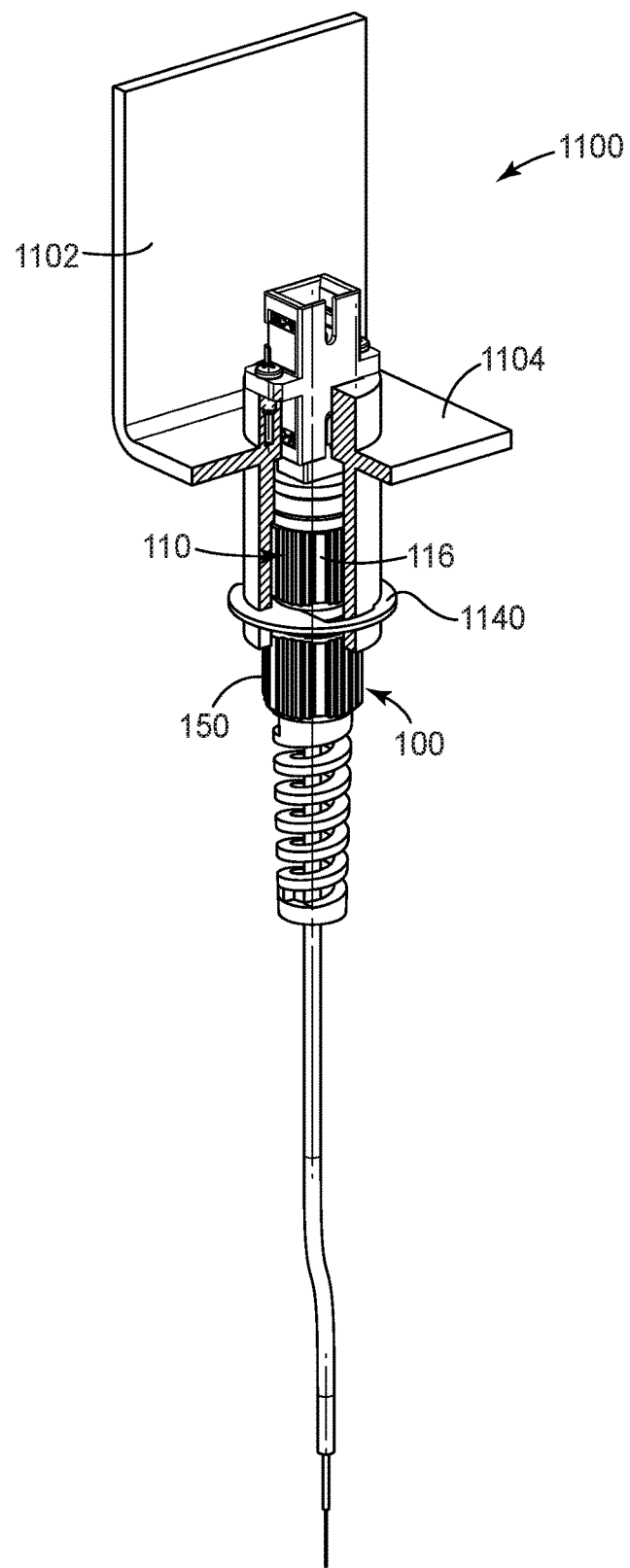

FIGS. 6A and 6B show a method of securing the exemplary optical fiber connector (e.g. optical connectors 100, 200, 300, 400) having a port connection mechanism to a standard optical connector adapter through a port of the telecommunication enclosure. The figures show a portion of a telecommunication enclosure 1100. The telecommunication enclosure can be a terminal enclosure such as BPEO closure, a fiber dome closure, or another suitable outside plant fiber closure, each of which is available from 3M Company (St. Paul, Minn.) as well as other vendors.

The portion of the telecommunication enclosure 1100 shown in the figures includes a first wall section 1102 and a second wall section 1104 extending approximately perpendicularly from the first wall section. The second wall section is shown having one port structure 1110 for receiving a fiber optic connector of the present invention. The exemplary port structure can be a cylindrical port structure having an exterior portion 1111 disposed outside of the enclosure and an interior portion 1112 extending into the enclosure from the second wall. The exemplary port structure can have other geometric configurations such as a hexagonal prism, a rectangular prism or other polygonal prism.

When optical connector 100 is inserted into the port structure 1110, the external sealing member 145 of the optical connector provides an environmental seal between the internal circumference of the port structure and the optical connector. The internal seal housed within the main body of the connector provides a seal between the main body of the connector and the optical fiber cable passing therethrough.

A standard telecommunication optical coupling 1120 can be attached to the top of the interior potion of the port structure by a mechanical fastener such as a screw 1130 or rivet that pass through fastening holes located in the central flange of the optical coupling, by an adhesive or via an interference fit wherein the top lip of the port structure has a pair of posts to engage with the fastening holes of the standard telecommunication optical coupling.

The port structure 1110 also includes a pair of slots or channels 1113 disposed on opposite sides of the exterior portion of the port structure. When an exemplary optical fiber connector 100 is installed in the port structure and engaged with the standard optical coupling, a port connection mechanism (i.e. a spring clip 1140 or staple) can be inserted in the slots to secure the exemplary fiber optic connector within the port structure. In an exemplary aspect, a U-shaped spring clip can be used as shown in the figure having two spaced apart arms extending from a joining section. When the spring clip is installed in the slots of the port structure as shown in FIG. 6B, the arms embrace the optical connector between the gripping surface 116 of the main body 110 and the compression member 150.

This optical connector retention method helps transfer any loads exerted on the optical fiber cable to the port structure of the telecommunication enclosure to provide a stable optical connection.

Figure 7A:
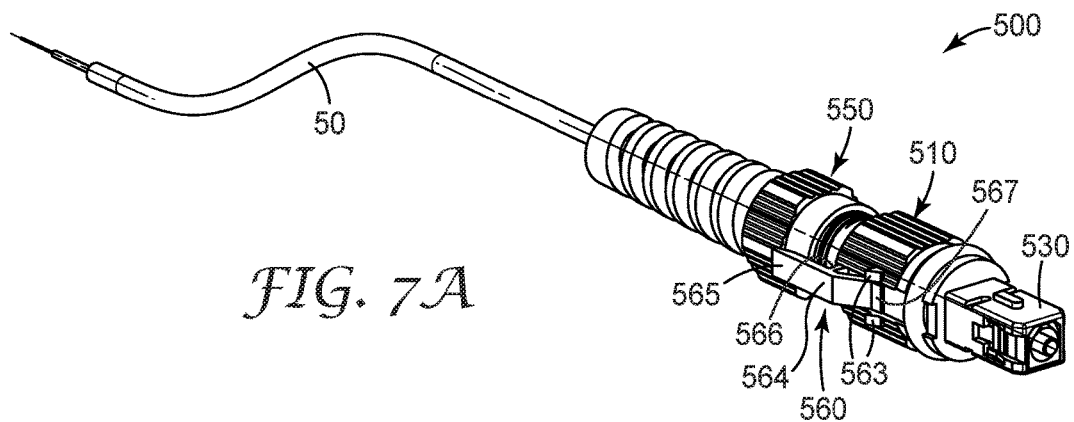
FIGS. 7A-7B show two views of a fifth embodiment of an exemplary optical fiber connector according to an aspect of the present invention.

FIG. 7A shows yet another embodiment of an optical connector 500 that includes a port connection mechanism. Optical fiber connector 500 includes a main body 510, a compression member 550 attachable to the second end of the main body and an optical connection portion (not shown) contained within an outer housing 530 that is attachable to the first end of the main body. Optical fiber connector 500 is similar to optical fiber connectors 100, 200 and or 300 (FIGS. 1A-1D, 3A-3D and 4) described previously, except that in this embodiment the main body 510 includes an integrally formed port connection mechanism 560.

Figure 7B:
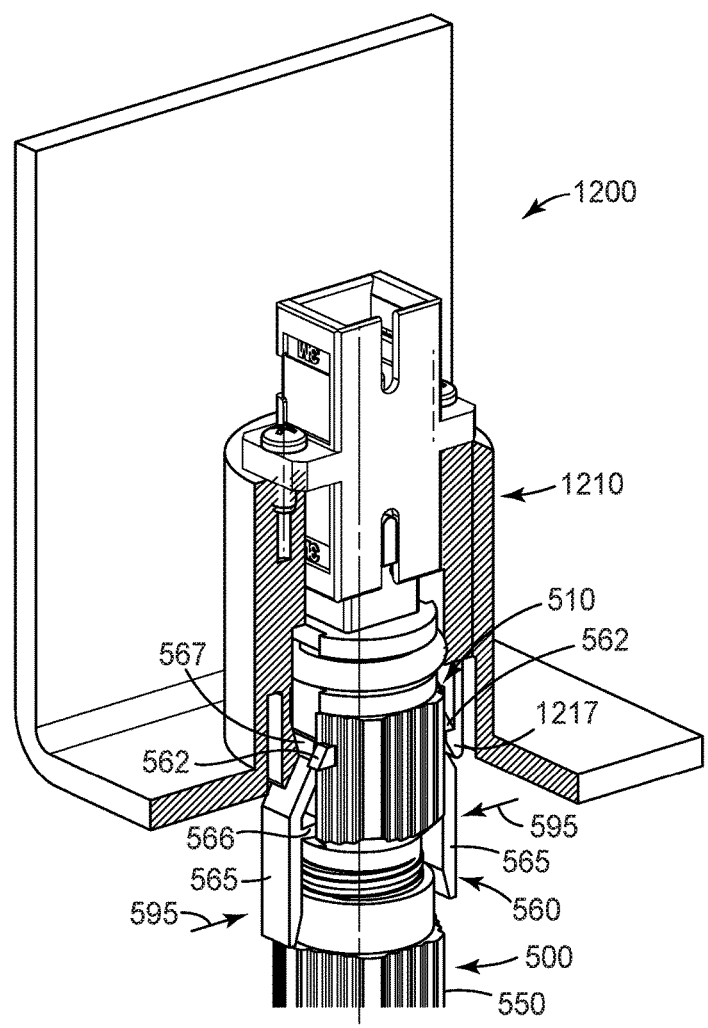

The port connection mechanism 560 includes a plurality of protrusions 562 extending from the exterior surface of the main body that are configured to mate with a receiving element 1217 within the port structure 1210 of telecommunication enclosure 1200 as shown in FIG. 7B and a release lever 565 which is configured to move the receiving elements away from the main body 510, freeing the protrusions so that connector 500 can be easily removed from the port structure. Release lever 565 can be connected to the main body of optical connector 500 by its fulcrum 566. A release arm 567 extends toward the front of the connector and an actuation arm extends from the fulcrum toward the back end of the connector near the compression member 550. When a force is applied to the actuation arms 565 in a direction indicated by arrows 595 the release lever pivots 567 around the fulcrum 566 moving the release arms away from the main body. The release arms engage with the receiving elements, pushing them away from the main body and disengaging the receiving elements from the protrusions to allow optical connector to be extracted from port structure 1210.

Figure 8A:
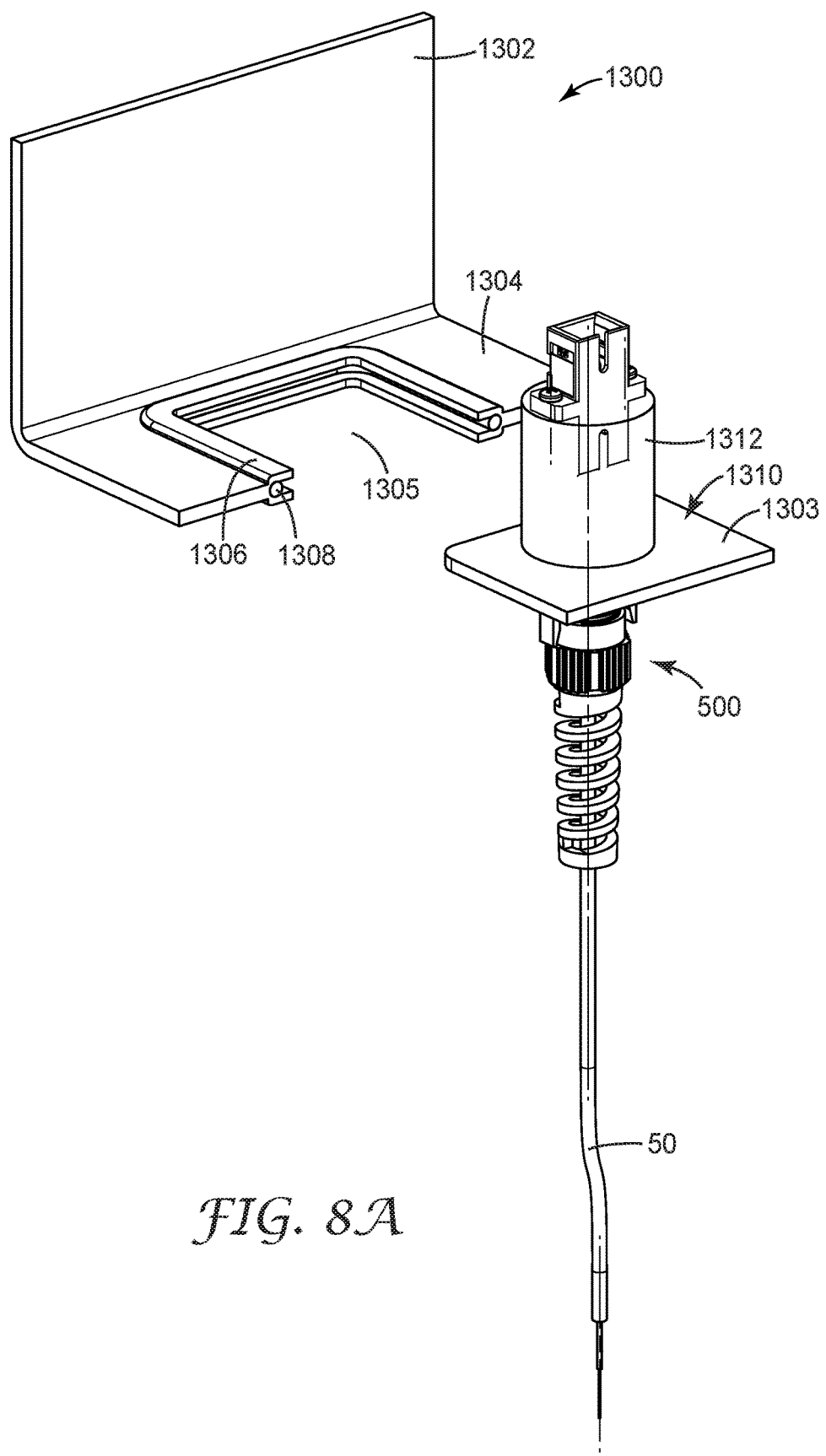
FIGS. 8A-8B show another method of securing the exemplary optical fiber connector of the present invention into a standard optical connector adapter through a port of the telecommunication enclosure.
Figure 8B:
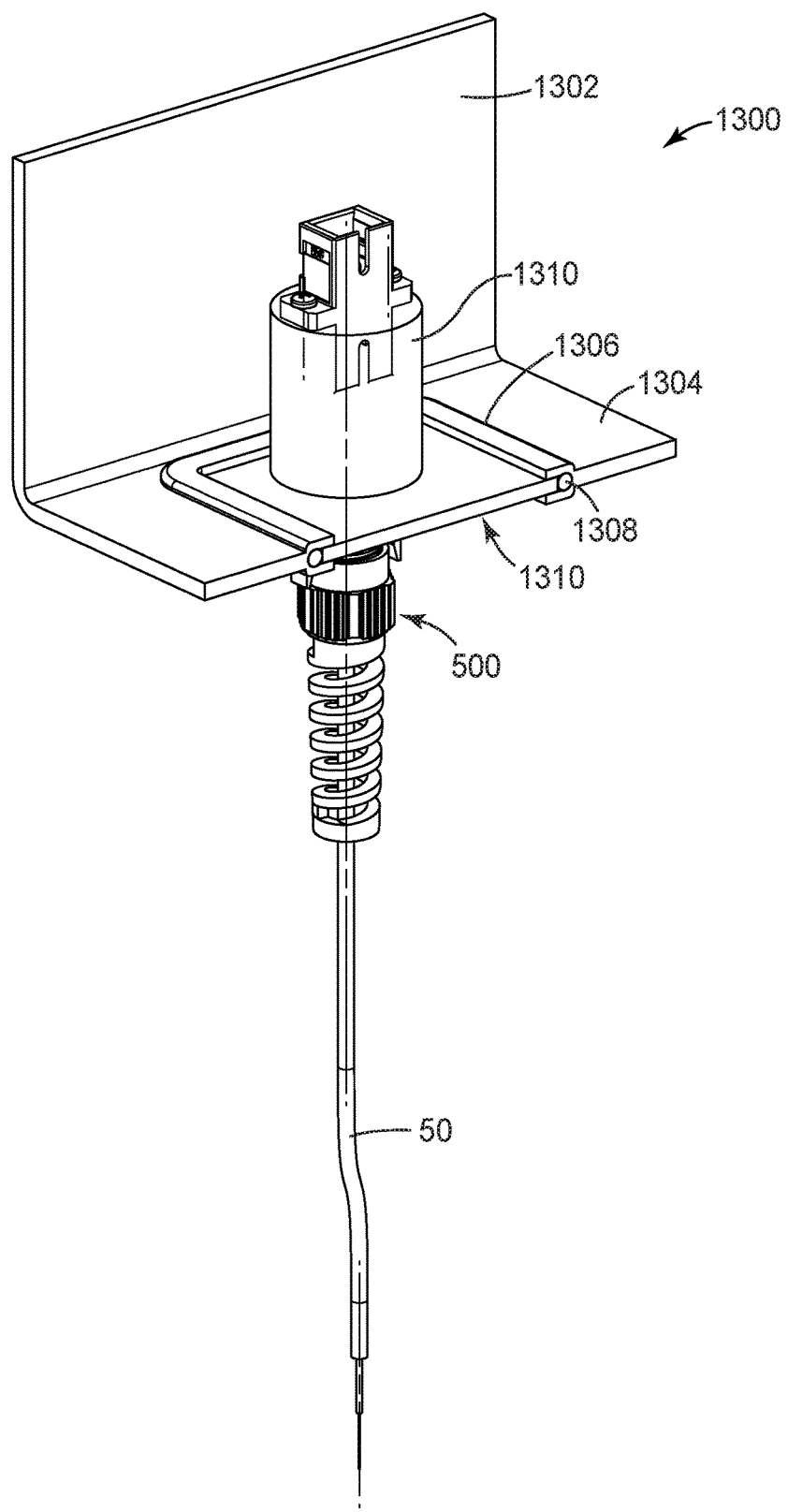

FIGS. 8A and 8B show optical fiber connector 500 mounted in a different telecommunication enclosure port structure 1310. Telecommunication enclosure 1300 of FIGS. 8A and 8B can be an optical network terminal, a network interface device or a distribution box. An exemplary distribution box that can utilize this port structure is described in PCT Publication No. WO 2012/074688, and is incorporated herein by reference.

The telecommunication enclosure 1300 of which only a portion is shown in FIGS. 8A and 8B includes a bottom wall 1302, a plurality of side walls 1304 extending from the base, a cover (not shown) which is removably securable to the base wherein at least one of the side walls includes a removable side wall portion 1303. In the particular embodiment, removable side wall portion 1303 includes a port structure 1310 for receiving a fiber optic connector of the present invention. The exemplary port structure can be a cylindrical port structure having an interior portion 1312 that extends into the enclosure from the side wall when the removable wall portion is installed in the enclosure. In an alternative aspect, removable side wall portion 1303 includes a plurality of port structures. The exemplary port structure can have other geometric configurations such as a hexagonal prism, a rectangular prism or other polygonal prism. The internal features of the port structure can be similar to port structure 1210 shown in FIG. 7B if the port structure is to be used in combination with fiber optic connector 500.

The side walls 1304 can include a number of openings 1305 having and inwardly facing channel 1306 formed around the perimeter of the opening to accept the removable wall segments. An optional gasket 1308 can be disposed in the bottom of channel 1306 when a high degree of environmental protection is needed. FIG. 8A shows a view of a portion of a side wall 1304 having the removable wall portion 1303 removed from opening 1305, while FIG. 8B shows the removable wall segment installed in channel 1305 of sidewall 1304.

Figure 9A:
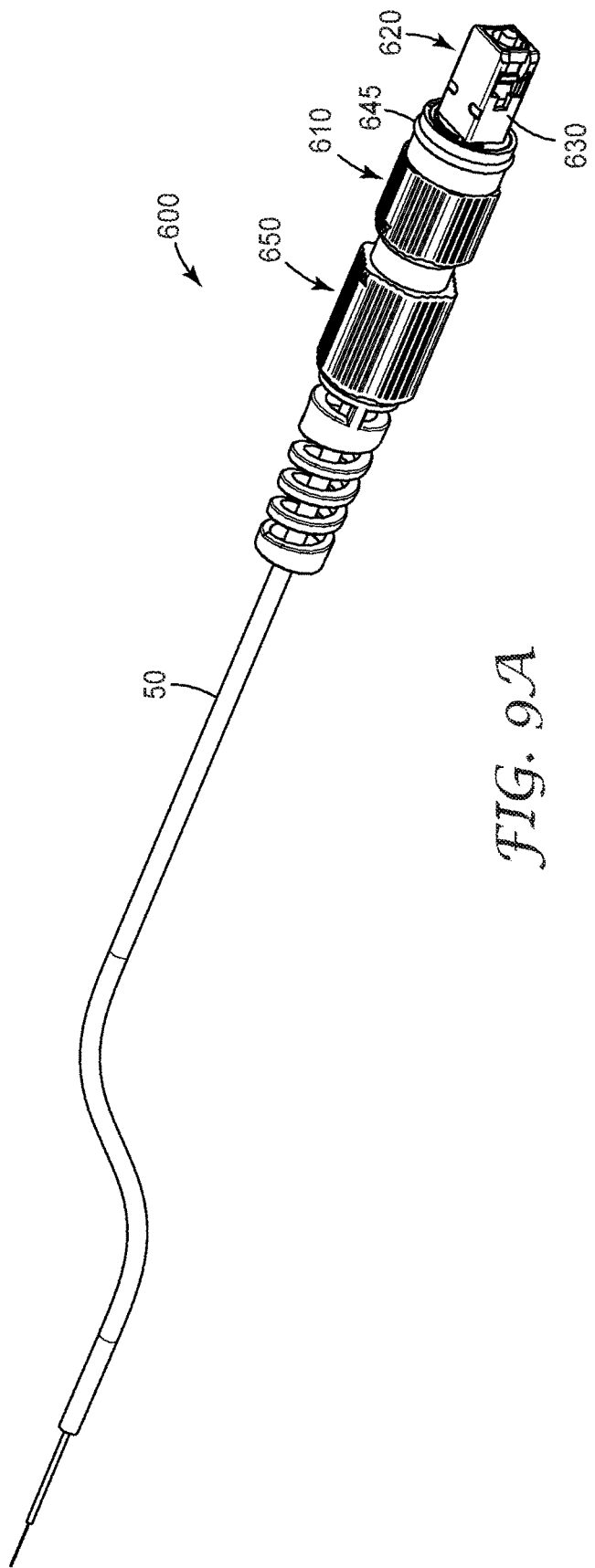
FIGS. 9A-9C show three views of a sixth embodiment of an exemplary optical fiber connector according to an aspect of the present invention.
Figure 9B:
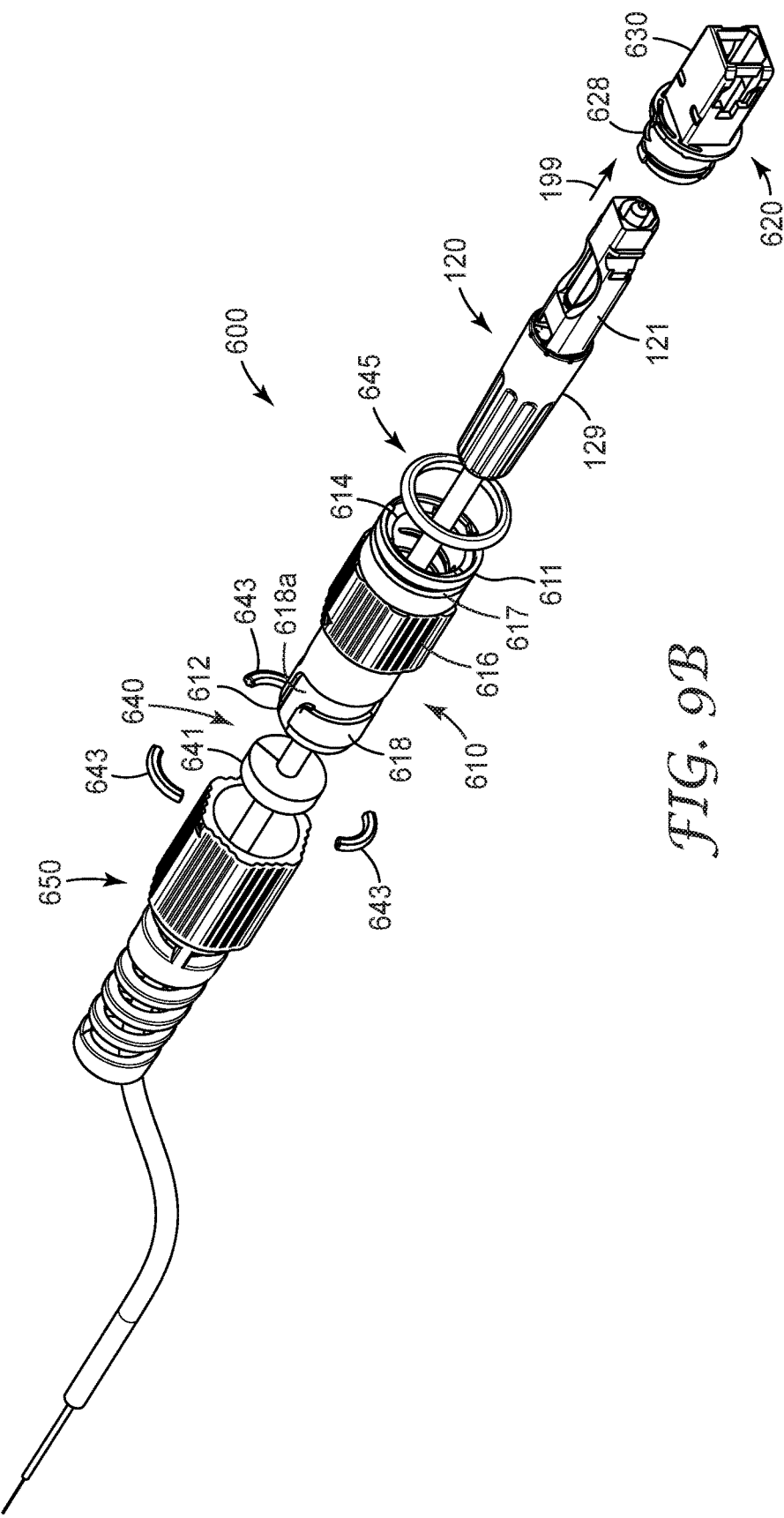
Figure 9C:
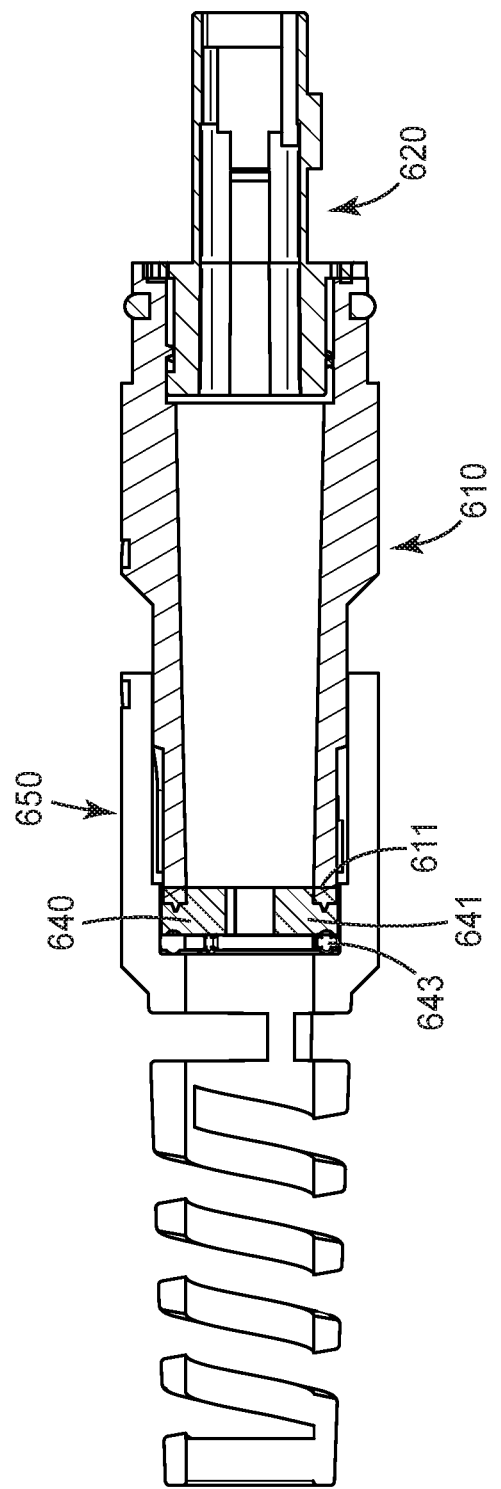

FIGS. 9A-9C show three views of another embodiment of an exemplary optical fiber connector 600. Optical fiber connector 600 includes a main body 610 having a first end 611 and a second end 612, a compression member 650 attachable to the second end of the main body and an optical connection portion 620 attachable to the first end of the main body. The compression member anchors an internal sealing member 640 between the compression member and the second end of the main body to provide an environmental seal between the optical fiber connector 600 and the telecommunications cable to which it is connected. Optical fiber connector 600 may be formed of plastic by conventional methods, for example by injection molding.

The main body 610 may be generally cylindrical in shape and includes an interior passageway 613 (FIG. 10B) that extends along the length of the main body from the first end 611 to the second end 612 of the main body. The main body includes a passage entry 614 at the first end 611 of the interior passageway and a passage exit (not shown) at the second end 612 of the interior passageway 613 that may be configured to accommodate certain categories of telecommunication cables including single fiber drop cables and/or multi-fiber cables.

The passage entry 614 of the interior passageway 613 is configured to accept and secure optical connection portion 620 to/in the first end 611 of the main body 610. As such, the passage entry can be shaped to closely conform to an outer perimeter portion of the optical connection portion.

In the exemplary embodiment of FIGS. 9A-9B, the main body 610 can have a gripping surface 616 on the external surface of the main body similar to that already described for optical fiber connector 100 of FIGS. 1A-1D. A groove 617 may be located between external gripping surface 616 and the first end 611 of main body 610 to receive an external sealing member 645 such as an o-ring. This external sealing member can provide an environmental seal between the optical fiber connector and a port of a telecommunication enclosure when the optical fiber connector is fully seated therein.

The main body 610 can have an external connection portion 618 located between external gripping surface 616 and the second end 612 of the main body 610. The external connection portion 618 includes at least one bayonet channel 618a that cooperates with at least one internal peg 658 (FIG. 10B) disposed within the open end of compression member 650. In the exemplary embodiment of optical fiber connector 600, the main body includes two bayonet channels 618a, 618a' (FIG. 10B) disposed on opposite sides of the main body and compression member 650 has two internal pegs 658 (although only one can be seen in the figures) that are configured to engage with the bayonet channels. Thus the compression member (having the internal sealing member disposed therein) is slid over the second end of the main body to secure the compression member to the main body. The internal pegs ride in the bayonet channel as the compression member is pushed forward (as indicated by directional arrow 695 in FIG. 10B) over the second end of the main body and is rotated (as indicated by directional arrow 696 in FIG. 10B) to secure the compression member to the second end of the main body. The internal sealing member is compressed longitudinally between the compression member and the second end of the main body as shown in FIG. 9C. Utilizing a bayonet style securing mechanism as described above may be advantageous in reducing torsional stresses applied to the telecommunication cable when the compression member is secured to the main body of the exemplary optical fiber connector.

Figure 10A:
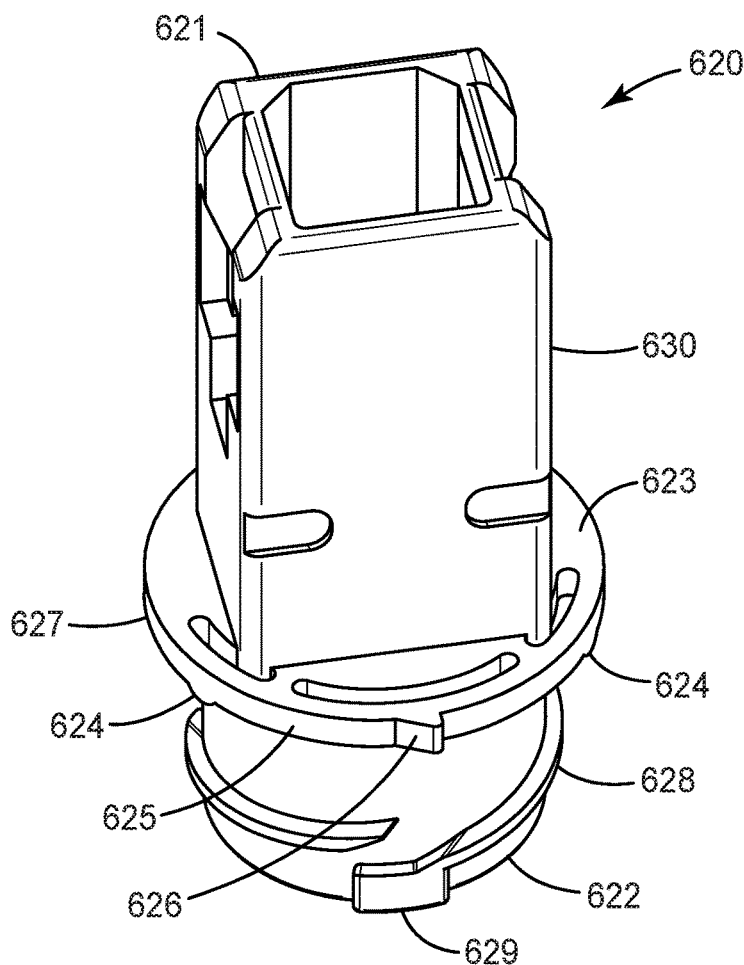
FIGS. 10A-10C show detail views of the components of the optical fiber connector of FIGS. 9A-9C.
Figure 10C:
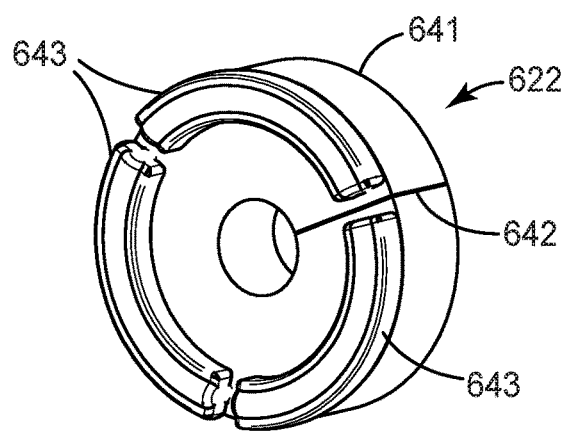

In one exemplary aspect, an internal sealing member 640 can include an elastomeric portion 641 and a segmented rigid portion 643 as shown in FIG. 10C. The elastomeric portion provides the sealing and cable gripping capability to the optical fiber connector to a telecommunication cable passing through the sealing member and the segmented rigid portion serves as skids to allow the compression member to rotate freely when the compression member is being secured to the second end of the main body of the exemplary optical fiber connector. Additionally, internal sealing member 640 may have a radial slit 642 to allow the telecommunication cable to be slipped into the internal sealing member from the edge of the sealing member. When this is done the segmentation of the segmented rigid portion allows the sealing member to flex so the slit can be opened to allow insertion. The internal sealing member can be formed by a two step molding process when the segmented rigid portion is formed of a rigid plastic material such as poly carbonate or polybutylene terephthalate, for example, or by an insert molding process when the rigid portion is formed of a rigid plastic material or metal.

In an exemplary aspect, the elastomeric portion of the internal sealing member can be formed from one of an ethylene propylene diene monomer (EPDM) rubber, a silicone rubber, a polyurethane elastomers or rubbers, natural rubber, a fluoroelastomer or other suitably soft resilient materials.

In an alternative aspect, the segmented rigid portion can be replaced by a slit ring made of either plastic or metal that can either be integrally formed with the internal sealing member or can be a separate piece which is positioned between the internal sealing member and the compression member during assembly of the exemplary connector.

Figure 10B:
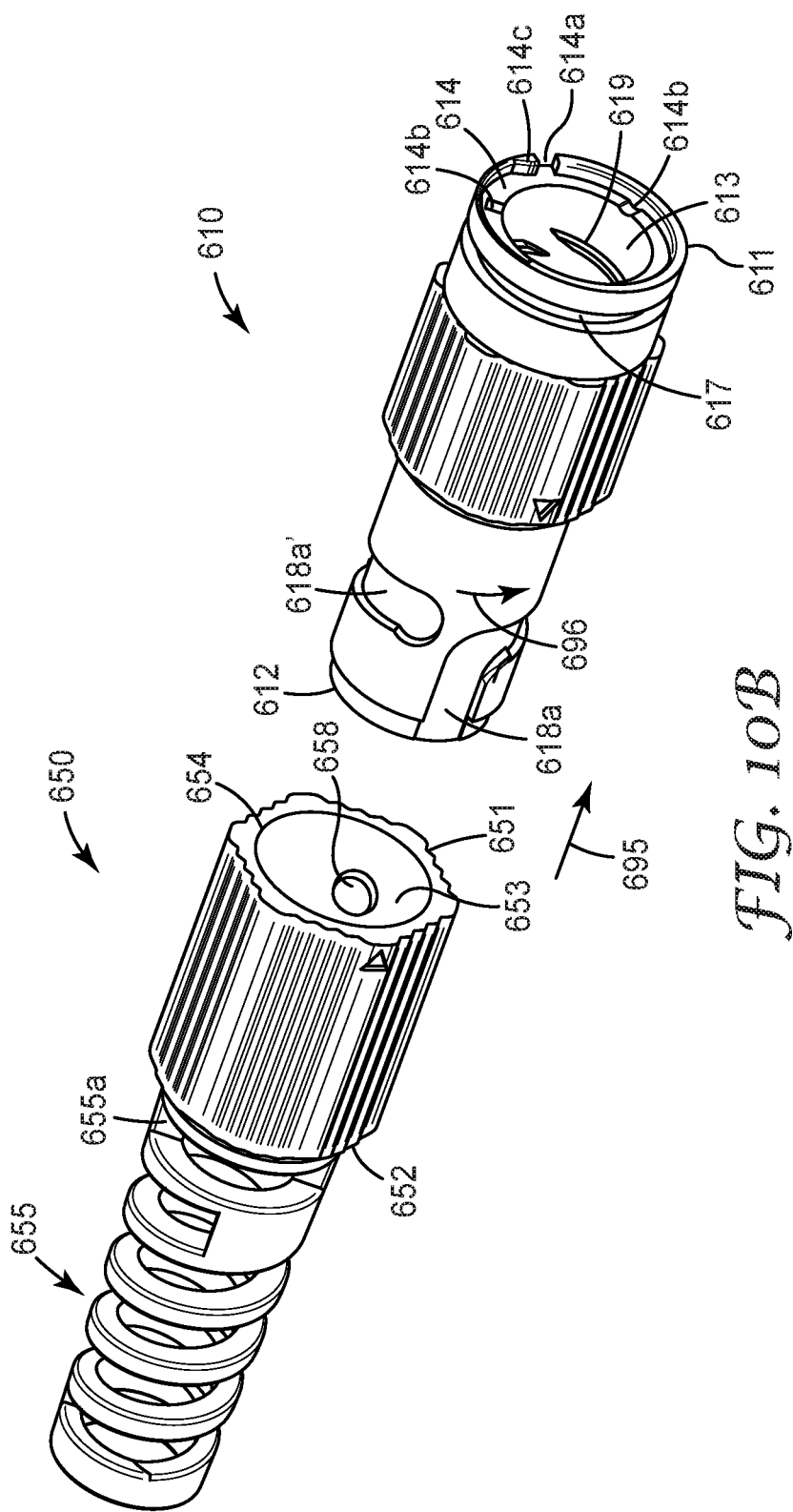

Referring to FIG. 10b, compression member 650 has an interior chamber 653 extending between the first side 651 and a second side 652. The interior chamber 653 has a first opening 654 at the first end 651 to accept the second end 612 of main body 610. The interior chamber 653 has a smaller second opening (not shown) at the second end 652 of compression member 650 to accommodate the passage of a telecommunication cable therethrough. The compression member can further include at least one internal peg 658 disposed within interior chamber 653 that cooperates with a corresponding bayonet channel 618a on the main body 610 of the optical fiber connector to secure the compression member to the main body and compress the internal sealing member therebetween.

In an alternative aspect, the bayonet channels can be formed within interior chamber of the compression member and the corresponding peg(s) that mate with the bayonet channels can be formed near the second end of the main body. Thus the positioning of the bayonet channels and corresponding pegs should not be considered a limitation to exemplary optical connector 600.

In addition, compression member 650 can further include an integral bend control boot 655 disposed on the second end 652 of the compression member. The bend control boot prevents a telecommunication cable from exceeding its minimum bend radius which could result in degradation of the signal being carried on the telecommunication cable. The bend control boot can include a tie bar 655*a* to provide strain relief to the telecommunication cable passing through the optical fiber connector when the telecommunication cable is attached to the tie bar by a cable tie or other securing mechanism.

The optical connection portion 620 can be secured to the main body 610 of optical fiber connector 600 via a threaded attachment mechanism. Optical connection portion 620 can include an external connection portion having an external thread 628 adjacent to the second end 612 thereof and an outer housing 630 at the first end 611 of the optical connection portion. The outer housing is configured to hold the internal components of a standard optical fiber connector (e.g. the backbone 121, collar body (not shown), ferrule 124 and boot 129) within the outer housing. For example, optical connection portion 620 is configured with an SC format outer housing 630. However, as would be apparent to one of ordinary skill in the art given the present description, optical connection portion and the outer housings could be configured to have other standard formats, such as MT, MPO, ST, FC, and LC connector formats as well as utilizing other connector styles such as factory mounted connectors.

The external thread 628 of the optical connection portion 620 is configured to engage with an internal thread 619 disposed in the interior passageway 613 that extends through the main body 610 of optical connector 600. In the exemplary aspect shown in FIGS. 9A-C, and 10A-B, a coarse external thread 628 and corresponding internal thread 619 are used to provide for a secure attachment of the optical connection portion to the main body while at the same time minimizing the torsional effects on the cable within the connection due to this attachment. In an exemplary aspect, the optical connection portion can be attached to the main body by engaging the threads and rotating the optical connection portion 120° with respect to the main body, although other degrees of rotation are a matter of design choice.

In an exemplary aspect, optical connection portion 620 can further include a positioning rib that ensures that the optical connection portion is inserted into the main body 610 in the proper orientation when engaging the external threads disposed on the optical connection portion with the internal threads within the main body.

In addition, optical connection portion 620 can have an abutment plate 623 disposed between outer housing 630 and the external connection portion. The abutment plate 623 ensures proper positioning of the connection portion with respect to the main body of the optical fiber connector. Abutment plate 623 can have a plurality of detents 624 extending from its surface that is adjacent to the external connection portion of the optical connection portion. The detents assist the craft in knowing when the optical connection portion is properly mounted in to the main body of the audible click by providing an audible click when the detents come to rest in matching divots 614*b* formed in the outward facing surface of passage entry 614. The abutment plate 623 can further include a locking nose 626 projecting from the edge 627 of the abutment plate. The locking nose is configured to engage with a notch 614*a* in the lip of the passage entry 614 to secure the optical connection portion to the main body. In an exemplary aspect, locking nose 626 can be disposed on a flexible bridge 625 to allow clearance for the nose to slide within the lip of the passage entry when the optical connection portion is secured to the main body.

Exemplary optical fiber connector 600 is assembled by first sliding compression member 650, the internal sealing member 640 and boot 129 over the fiber cable 50 for later use.

For field termination, optical fiber cable 50 is prepared by cutting of a portion of the fiber cable jacket 52 and stripping off a coated portion 55 of the optical fiber 54 near the terminating fiber end to leave a bare glass fiber portion 56 and cleaving (flat or angled) the fiber end to match the orientation of the pre-installed fiber stub, as described previously.

The prepared end of optical fiber cable 50 is inserted through the rear end of the backbone 121 of a partially pre-assembled optical connection portion 620 that includes the collar body with ferrule 124 secured within the backbone. In this manner, the prepared fiber end can be spliced to the fiber stub with the mechanical splice device within the collar body within backbone 121. The fiber cable 50 is continually inserted until the coated portion of the fiber begins to bow (which occurs as the end of fiber meets the fiber stub with sufficient end loading force). The splice device is actuated while the fibers are subjected to an appropriate end loading force. The fiber jacket can then be released, thereby removing the fiber bow.

The boot 129 (which is previously placed over fiber cable 50) is then pushed axially toward the backbone 121 and screwed onto the backbone mounting section to secure the boot in place to complete the mounting of the partially pre-assemble optical connection portion onto optical fiber cable 50. The partially pre-assemble optical connection portion is then secured in outer housing 630 to complete the assembly of connection portion 620.

Figure 11C:
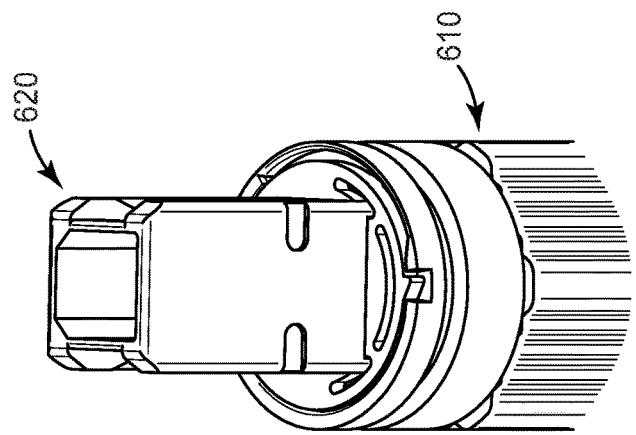
FIGS. 11A-11C show detail views of the connection of an optical connection portion to the main body of the optical fiber connector of FIGS. 9A-9C.
Figure 11B:
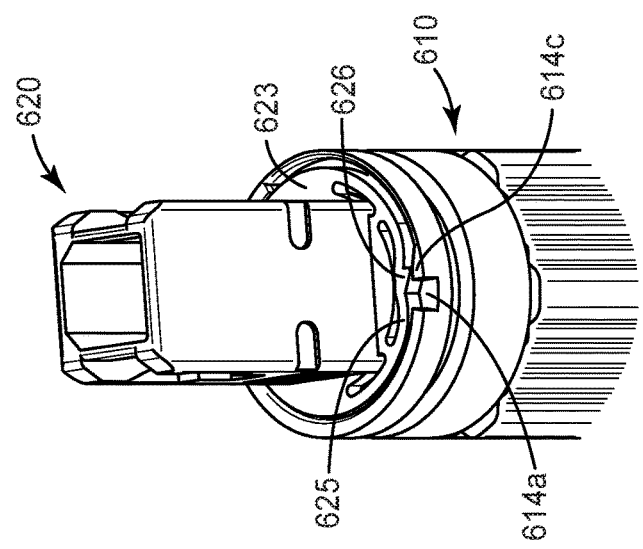
Figure 11A:
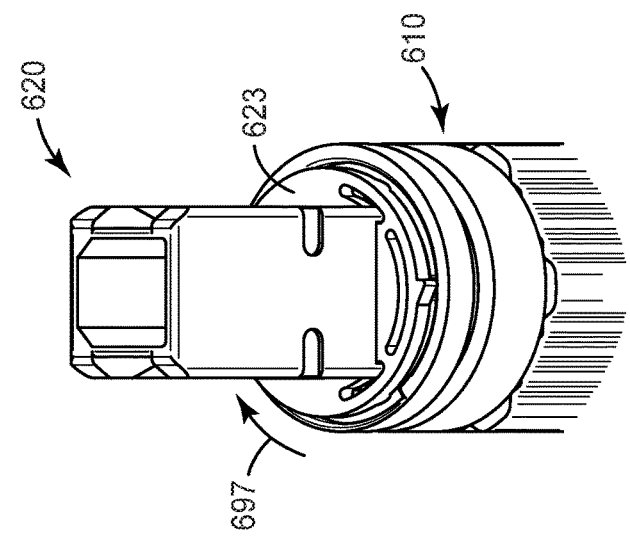

Referring to FIGS. 11A-11C, the main body 610 is moved forward over the back end of the optical connection portion 620 until abutment plate 623 is adjacent to the passage entry 614 (best seen in FIG. 10B). The optical connection portion is rotated in the direction indicated by arrow 697. Locking nose 626 slides within the passage entry until it encounters deflection wedge 614*c*. The deflection wedge pushes on the locking nose 626 causing flexible bridge 625 to flex as shown in FIG. 11B until the pressure is released when the locking nose 626 enters notch 614*a* in the lip of the passage entry 614 and the detents on the bottom face of the abutment plate slide into matching divots in passage entry 614 with an audible click marking the final securing of the optical connection portion 620 to the main body 610 of the optical connector as shown in FIG. 11C.

The internal sealing member is pushed along optical fiber cable 50 and slid until it is in contact with the second end 612 of the main body. Compression member 650 is slid forward and secured to the main body by engaging the compression member with the second end 612 of the main body 610 to yield the fully assembled optical connector 600 as shown in FIG. 9A. The tightening of the compression member 650 to the main body compresses the internal sealing member. In an alternative embodiment, the internal sealing member can be fitted over the cable just prior to securing the compression member to the main body by inserting the cable into the sealing member by through the radial slit in the internal sealing member.

Figure 12:
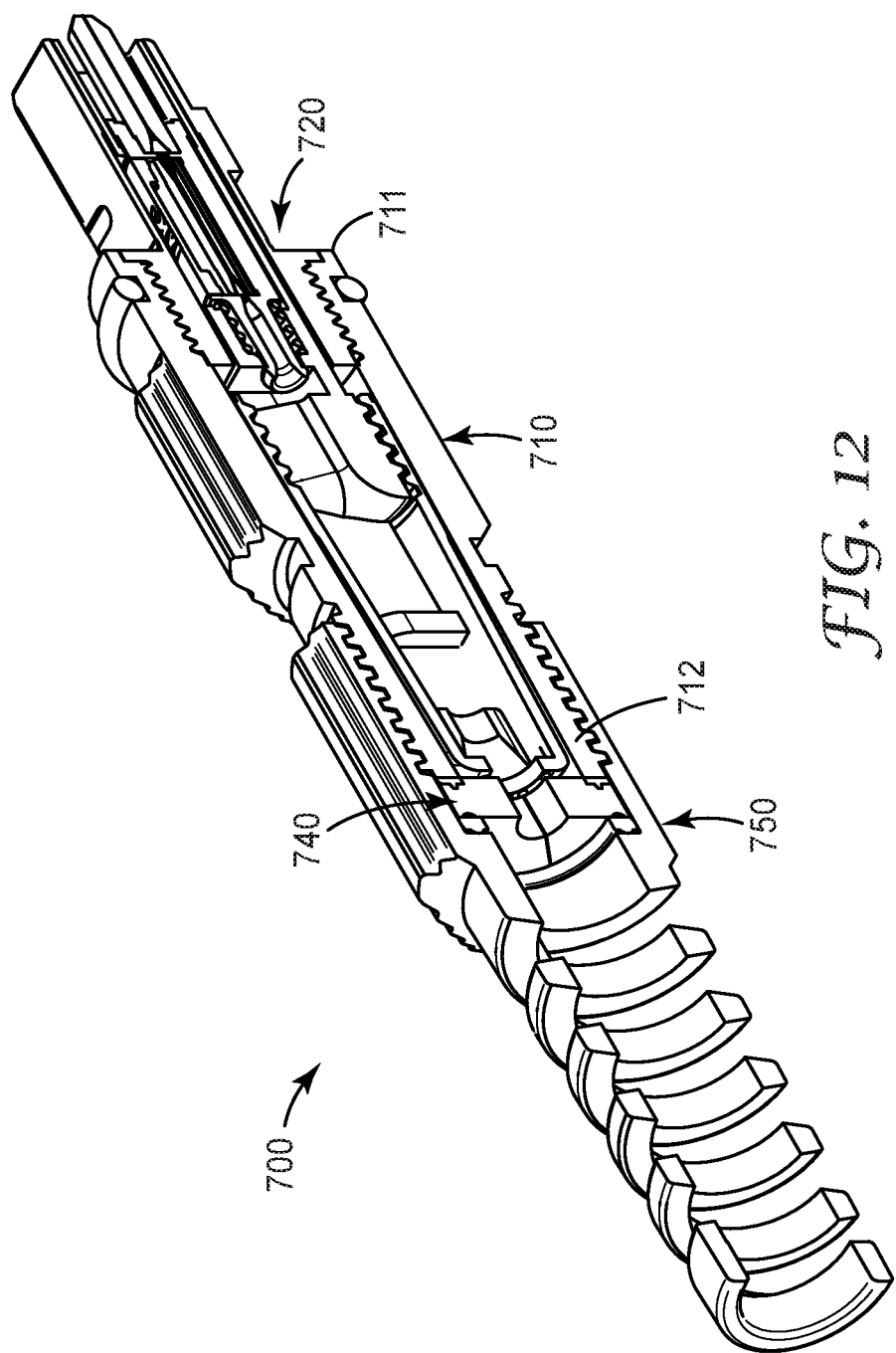
FIG. 12 is a sectional view showing a seventh embodiment of an exemplary optical fiber connector according to an aspect of the present invention.

FIG. 12 shows another embodiment of an exemplary optical fiber connector 700 that is similar to optical fiber connector 600 described previously with the exception that the main body 710 is threadably coupled to compression member 750 rather than utilizing the bayonet connection mechanism shown in FIGS. 9A-9C. Specifically, the main body 710 has a first end 711 and a second end 712, a compression member 750 attachable to the second end of the main body and an optical connection portion 720 threadably attachable to the first end of the main body. The compression member anchors internal sealing member 740 between the compression member and the second end of the main body to provide an environmental seal between the optical fiber connector 700 and the telecommunications cable to which it is connected. Optical fiber connector 700 may be formed of plastic by conventional methods, for example by injection molding.

Figure 13A:
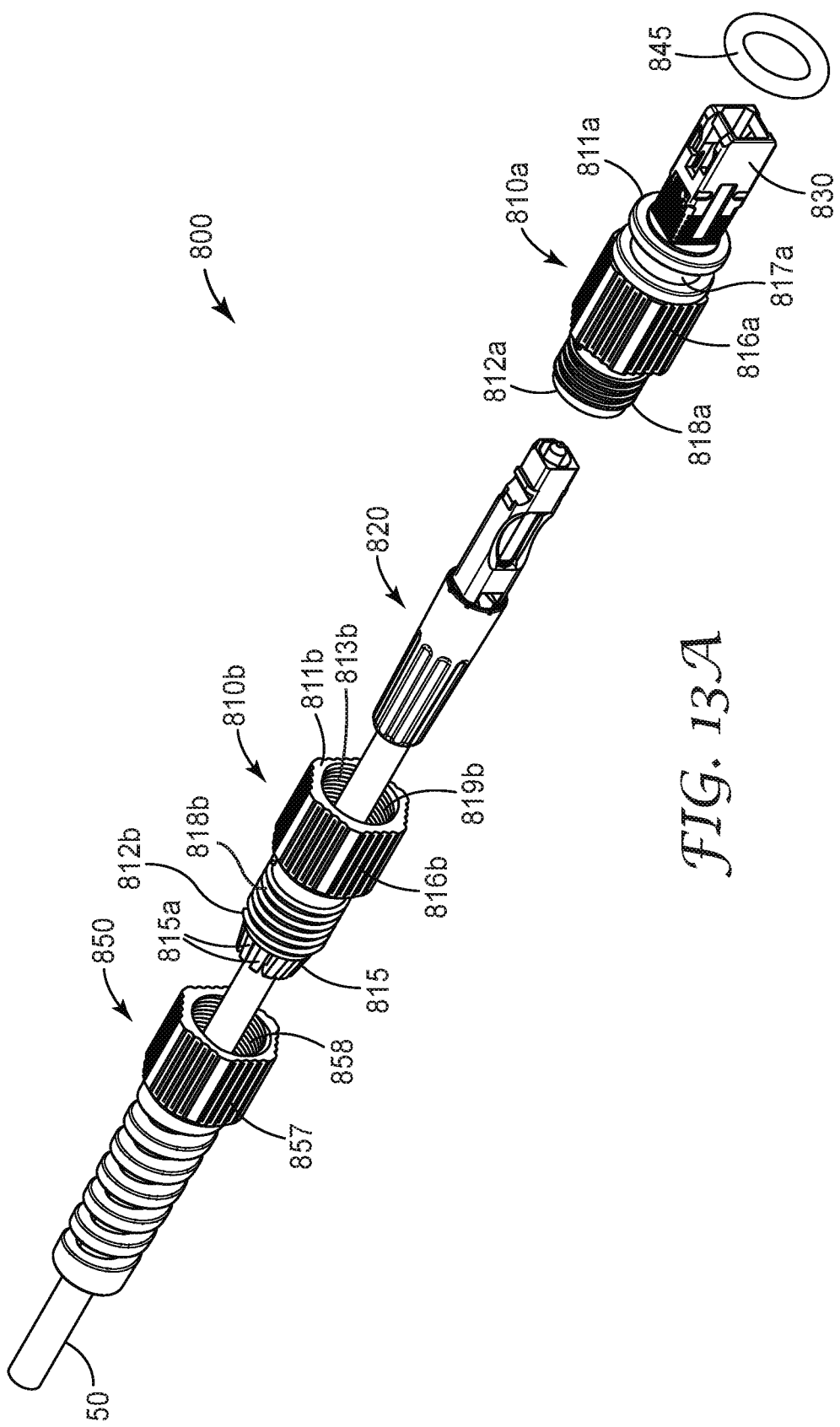
FIGS. 13A-13C show three views of a eighth embodiment of an exemplary optical fiber connector according to an aspect of the present invention.
Figure 13B:
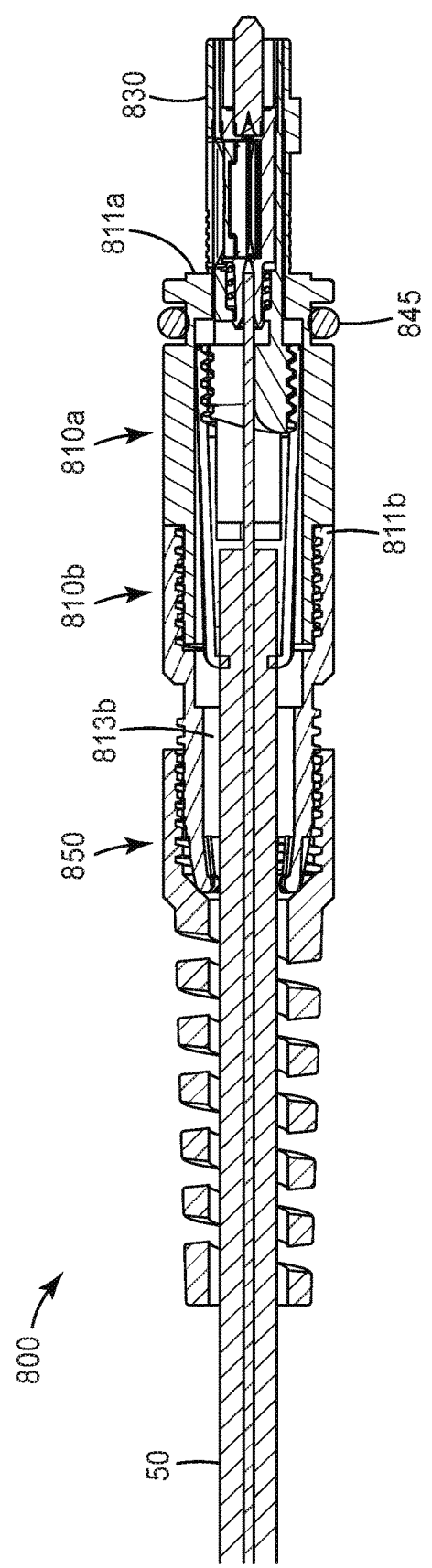
Figure 13C:
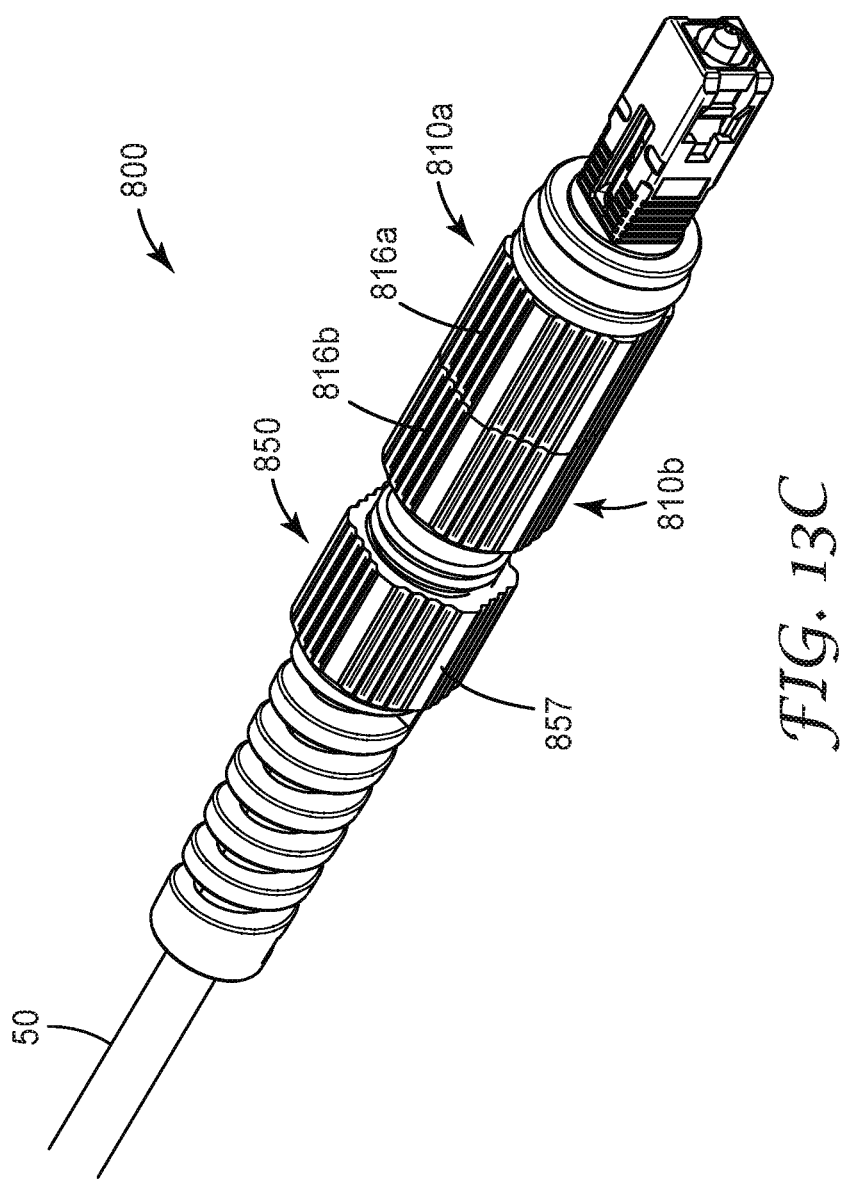

In some applications, it can be beneficial to have a more modular connector design where the critical functions are separated into separate connector components as shown in reference to optical fiber connector 800 in FIGS. 13A-13C. FIG. 13A is an exploded view of optical fiber connector 800. FIG. 13B is a sectional view of optical fiber connector 800, and FIG. 13C is a view of a fully assembled optical fiber connector 800. Exemplary optical fiber connector 800 can be used in applications where a lower degree of environmental protection is required such as in an indoor application or a protected outdoor application (e.g. to provide an external connection to a fiber distribution box disposed in a protected breezeway or garage), or to provide an external connection to fiber links disposed within an free-breathing aerial enclosure or terminal.

In this embodiment, the connector body is divided into a first body portion 810a and a second body portion 810b. The first body portion houses optical connection portion 820 (which is similar to optical connection portion 120 of the optical fiber connector 120 described previously), while the second body portion can include compressible portion 815 to grip the sheath of the telecommunication cable 50 and/or facilitate centering of the cable in optical fiber connector 800.

First body portion 810a can have a first end 811a and a second end 812a. Outer housing 830 can be disposed at the first end of the first body portion, via one of the attachment mechanisms described previously (e.g. via a snap fit as described with reference to FIG. 1B, mechanical connection means as described with reference to FIG. 3A, via threaded connection as described with reference to FIGS. 5 and 9B) or can integrally molded with the first body portion (as described with reference to FIG. 4). Optical connection portion 820 can be inserted through interior passage way (not shown) of the first body portion 810a until it engages with the outer housing disposed on the first end of the first body portion to secure the optical connection portion within the first body portion.

In an exemplary embodiment, the first body portion can have a gripping surface 816a on the external surface of the first body portion. The external gripping surface may have a hexagonally shaped cross-section to facilitate gripping of the cable securing device with a tool or by hand. The gripping surface may be textured (e.g. a ridged or cross-hatched texture) to further facilitate gripping of the first body portion.

A groove 817a may be located between external gripping surface 816a and the first end 811a of first body portion 810a to receive an optional external sealing member 845 such as an o-ring. This optional external sealing member can provide an environmental seal between the optical fiber connector and a port of a telecommunication enclosure, if required, when the optical fiber connector is fully seated therein.

The first body portion 810a can include external threads 818a adjacent to the second end 812a of the first body portion. External threads 818a cooperates with a corresponding internal threaded portion 819b disposed adjacent to the first end 811b of the second body portion 810b.

Second body portion 810b can have a first end 811b and a second end 812b. The second body portion can have an internal threaded portion 819b disposed in interior passageway 813b adjacent to the first end 811b of the second body portion and a compressible portion 815 disposed adjacent to the second end 812b of the second body portion. Compressible portion 815 may be reduced in size (diameter) when an external radial force is exerted on it such as by application of compression member 850.

The compressible portion 815 can have a plurality of spaced apart projections 815a extending from the second body portion 810b near the second end 812b thereof. In an exemplary aspect, each projection can have a barb (not shown) and/or a plurality of teeth (not shown) disposed near its interior end (i.e. the side of the projection that faces the interior passageway 813b of the second body portion). The barbs can penetrate the sheath of a telecommunication cable when compression member 850 is secured to the second end of the second body portion. The compression member 850 can exert a radial force on the spaced apart projections 815a pushing them inward and pushing the barbs into the sheath of the telecommunications cable 50.

The second body portion 810b can include external threads 818b adjacent to the second end 812b of the second body portion. External threads 818b cooperates with a corresponding internal threaded portion 858 of compression member 850 (which is analogous to compression member 150 shown in FIG. 1A).

In an exemplary embodiment, the second body portion 810b can have a gripping surface 816b on the external surface adjacent to the second body portion. The external gripping surface may have a hexagonally shaped cross-section to facilitate gripping of the cable securing device with a tool or by hand. The gripping surface may be textured (e.g. a ridged or cross-hatched texture) to further facilitate gripping of the first body portion.

In an exemplary aspect, the gripping surfaces 816a, 816b, 857 of the first body portion 810a, the second body portion 810b and compression member 850, respectively, are aligned when optical fiber connector 800 is fully assembled as shown in FIG. 13C.

In an alternative aspect one or more internal sealing members can be disposed in optical fiber connector 800 when a higher level of environmental protection is required. A first internal sealing member can be disposed between the first and second body portions to seal this junction point and a second internal sealing member may be inserted into the second end of the second body portion to provide an environmental seal between the cable and the optical fiber connector.

While exemplary optical fiber connector 800 comprises two body portions, embodiments containing more than two body portions are contemplated and will be discussed below in additional detail with respect to FIGS. 14A-14C. In each embodiment having a plurality of body portions, the first body portion will usually house the connector portion, while any additional body portions can have a variety of functionalities such as environmental sealing, strain relief/cable clamping, spatial extension to accommodate a long connectors, etc.

Figure 14A:
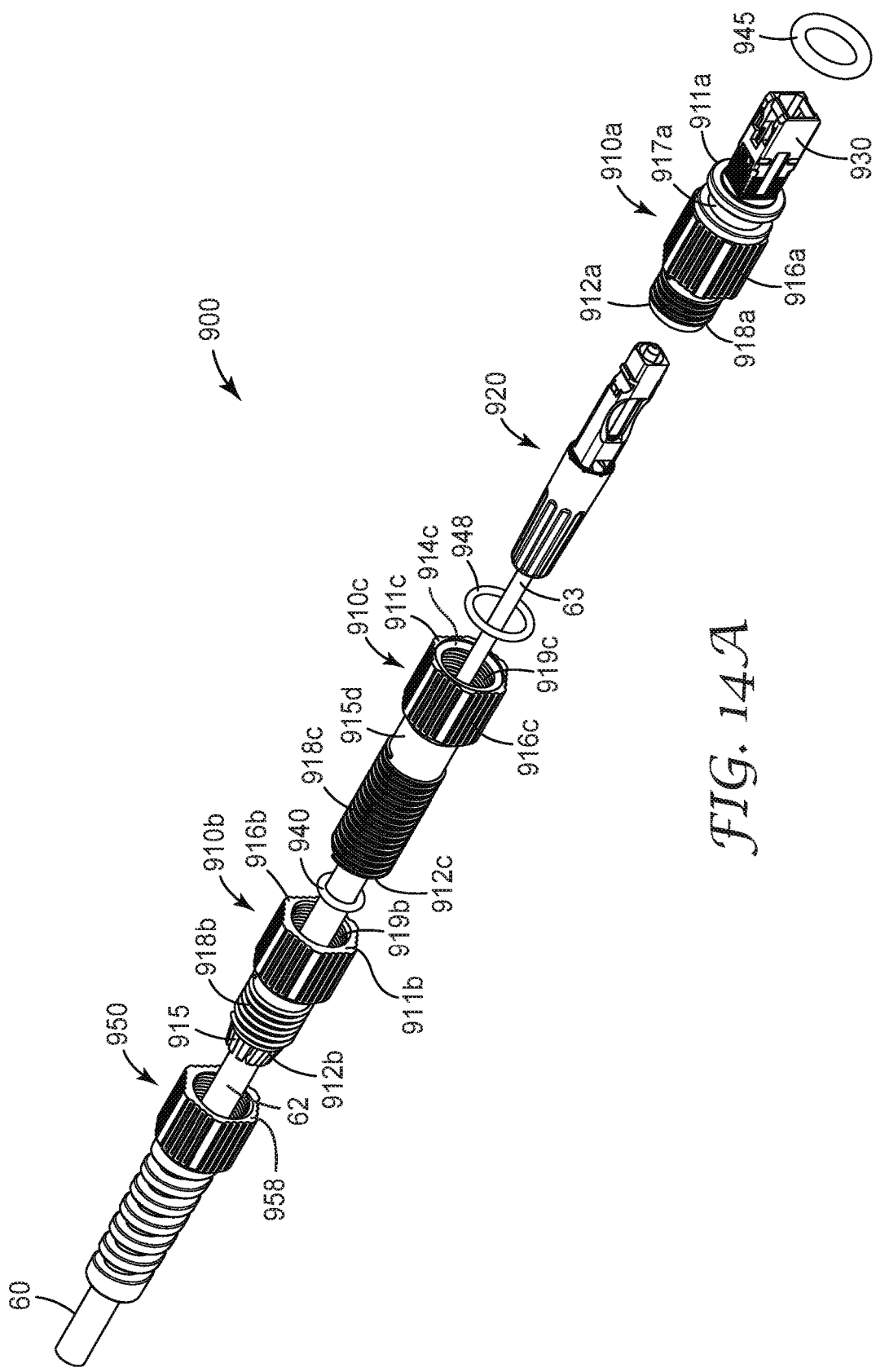

FIG. 14A is an exploded view of optical fiber connector 900. FIG. 13B is a view of a fully assembled optical fiber connector 900, and FIGS. 14C and 14D are sectional views of optical fiber connector 900 showing two alternative methods of securing the strength members of optical cable 60 to optical fiber connector 900.

In this embodiment, the connector body is divided into a first body portion 910a, a second body portion 910b and a third or intermediate body portion 910c. The first body portion 910a houses optical connection portion 920 (which is similar to optical connection portion 120 of the optical fiber connector 100 described previously) while the second body portion can include compressible portion 915 to grip the sheath of the telecommunication cable 60 and/or facilitate centering of the cable in optical fiber connector 900. The intermediate body portion 910c provides for a special expansion of optical fiber connector 900.

First body portion 910a can have a first end 911a and a second end 912a. Outer housing 930 can be disposed at the first end of the first body portion, via one of the attachment mechanisms described previously (e.g. via a snap fit as described with reference to FIG. 1B, mechanical connection means as described with reference to FIG. 3A, via threaded connection as described with reference to FIGS. 5 and 9B) or can integrally molded with the first body portion (as described with reference to FIG. 4). Optical connection portion 920 can be slipped though the compression nut 950, the intermediate and second body portions and any internal sealing members and inserted through interior passage way (not shown) of the first body portion 910a until it engages with the outer housing disposed on the first end of the first body portion to secure the optical connection portion within the first body portion.

In an exemplary embodiment, first body portion 910a can have a gripping surface 916a on the external surface of the first body portion. The external gripping surface may have a hexagonally shaped cross-section to facilitate gripping of the cable securing device with a tool or by hand. The gripping surface may be textured (e.g. a ridged or cross-hatched texture) to further facilitate gripping of the first body portion.

A groove 917a may be located between external gripping surface 916a and the first end 911a of first body portion 910a to receive an optional external sealing member 945 such as an o-ring. This optional external sealing member can provide an environmental seal between the optical fiber connector and a port of a telecommunication enclosure, if required, when the optical fiber connector is fully seated therein.

The first body portion 910a can include external threads 918a adjacent to the second end 912a of the first body portion. External threads 918a cooperate with a corresponding internal threaded portion 919c disposed adjacent to the first end 911c of the intermediate body portion 910b.

The intermediate body portion 910c can includes an extension portion 915d adjacent to the second end 912c of the intermediate body portion and a gripping surface 916a on the external surface of the first body portion 910a adjacent to its first end 911c. The gripping surface 916c of the intermediate body portion can have the same configuration as the gripping surface 916a of the first body portion or in this case gripping surface 916c can have a hexagonal cross section. The extension portion 915d can be varied in length according to the length of the optical connection portion and any open portion of cable 60 where the cable sheath has been removed.

An intermediate sealing member 948 can be disposed in a stepped opening 914c at the first end of the intermediate body portion 910c (between the first end and internal threads 919c). The intermediate sealing member can be compressed between the first body portion 910a and the intermediate body portion 910c when the internal threads 919c on the intermediate body portion are tightened against the external threads 918a disposed adjacent to the second end 912a of the first body portion as shown in FIGS. 14C and 14D. The internal sealing member 948 can be an o-ring or a split grommet as described previously. In this way, intermediate sealing member 948 prevents ingress of environmental contaminants into optical fiber connector 900 though the joint between the first body portion and the intermediate body portion.

Intermediate body portion 910c can also include a sealing member receiving pocket 915c at the second end 912c of the interior passage way. Receiving pocket 915c is configured to accept internal sealing member 940. The internal sealing member 940 can provide a barrier to environmental contaminants between the sheath of the cable and optical fiber connector 900 when the internal sealing member is compressed between the intermediate body portion 910c and the second body portion 910b when the internal threads 919b of the second body portion are tightened against the external threads 918c disposed adjacent to the second end 912c of the intermediate body portion 910c.

The intermediate body portion 910c includes external threads 918c adjacent to the second end 912c of the intermediate body portion. External threads 918c cooperate with a corresponding internal threaded portion 919b disposed adjacent to the first end 911b of the second body portion 910b.

Second body portion 910b can have a first end 911b and a second end 912b. The second body portion can have an internal threaded portion 919b disposed in interior passageway 913b adjacent to the first end 911b of the second body portion and a compressible portion 915 disposed adjacent to the second end 912b of the second body portion. Compressible portion 915 is similar to compressible portion 815 of optical fiber connector 800 as described previously and can be reduced in size (diameter) when an external radial force is exerted on it such as by application of compression member 950. The compressible portion 915 can have a plurality of spaced apart projections extending from the second body portion 910b near the second end 912b thereof. In an exemplary aspect, each projection can have a barb and/or a plurality of teeth disposed near its interior end (i.e. the side of the projection that faces the interior passageway 913b of the second body portion). The barbs can penetrate the sheath of a telecommunication cable when compression member 950 is secured to the second end of the second body portion. The compression member 950 can exert a radial force on the spaced apart projections, pushing them inward and pushing the barbs into sheath 62 of the telecommunications cable 60.

The second body portion 910b can include external threads 918b adjacent to the second end 912b of the second body portion. External threads 918b cooperates with a corresponding internal threaded portion 958 of compression member 950 (which is analogous to compression member 150 shown in FIG. 1A). The compression member 950 can exert a radial force on the spaced apart projections pushing them inward and pushing the barbs into sheath 62 of the telecommunications cable 60.

In an exemplary embodiment, the second body portion 910b can have a gripping surface 916b on the external surface adjacent to the second body portion. The gripping surface 916b of the second body portion can have the same configuration as the gripping surfaces 916a, 916c of the first body portion and the intermediate body portion or in this case gripping surface 916*b* can have a hexagonal cross section.

Figure 14B:
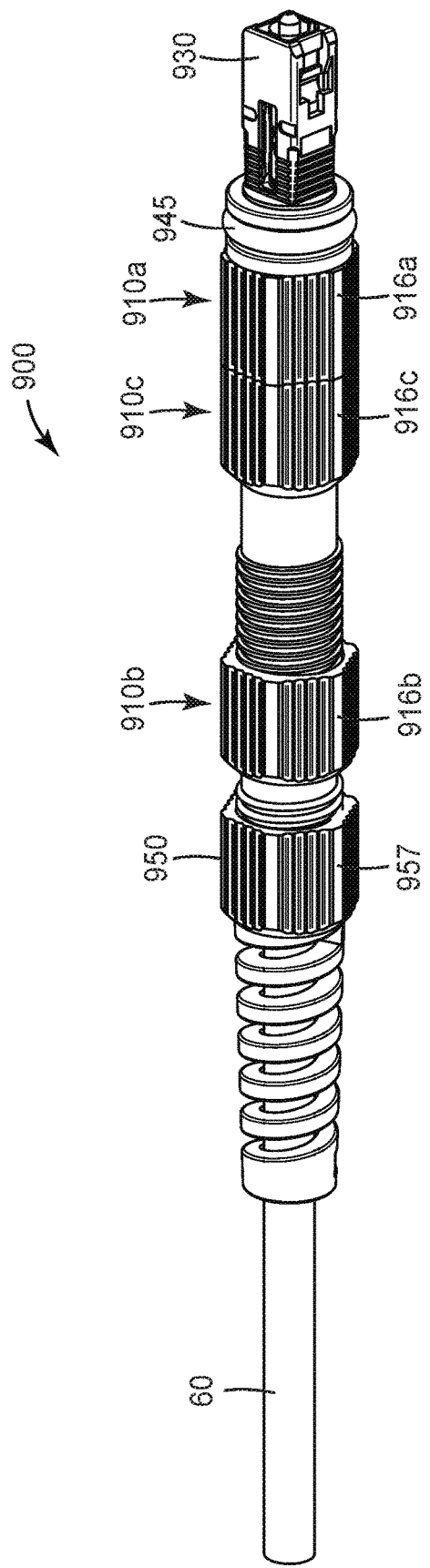

In an exemplary aspect, the gripping surfaces 916*a*, 916*b*, 916*c*, 957 of the first body portion 910*a*, the second body portion 910*b*, the intermediate body portion 910*c*, and compression member 950, respectively, can be aligned when optical fiber connector 900 is fully assembled as shown in FIG. 14B to yield a small ruggedized, low profile optical fiber connector.

In an exemplary aspect, the strength members of optical fiber cable 60 can be anchored to optical fiber connector 900. Optical fiber cable 60 can include one or more buffer coated optical fibers 64 surrounded by a first layer of glass or aramid fiber strength members 68 surrounded by a tube 63 or jacket layer. A second layer of glass or aramid fiber strength members 67 surrounds tube and is enclosed by a semi-rigid outer sheath 62 and can include one or more additional more rigid strength members (not shown). In an exemplary aspect cable 60 can be a Series 1129 Acoptic® FTTH Outdoor Cable, available from Acome (Paris, France).

In a first exemplary embodiment, the first layer of strength members 68 is captured in the threaded connect region between the backbone 921 and boot 929 of optical connection portion 920 and the second layer of strength members 67 is captured in the threaded connect region between the first body portion 910*a* and the intermediate body portion 910 of optical fiber connector 900 as illustrated in FIG. 14C.

In a second exemplary embodiment, the first layer of strength members 68 and the second layer of strength members 67 are captured in the threaded connect region between the backbone 921 and boot 929 of optical connection portion 920 of optical fiber connector 900 as illustrated in FIG. 14C.

The exemplary fiber optic connectors, described herein, illustrate several advantages over conventional hardened connectors. In one aspect the exemplary optical fiber connector can be field terminated by utilizing a suitable field mountable optical connection portion. In another aspect, the exemplary optical fiber connector can be factory mounted utilizing a factory mounted connection portion. In addition, the exemplary optical fiber connector can be assembled on the end of a pre-terminated cable by incorporating the pre-terminated optical connection structure into the exemplary optical fiber connector disclosed herein.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein.

We claim:

1. A method of terminating an optical fiber drop cable with a ruggedized optical fiber connector, the method comprising:
   stripping and cleaving a terminal end of the optical fiber drop cable to reveal a bare glass portion of an optical fiber;
   securing the bare glass portion of the optical fiber in a fiber optic connector body of an optical connection portion;
   sliding the optical connection portion through an interior passage way of a main body of the ruggedized optical fiber connector;
   connecting an outer housing over the optical connection portion;
   securing the outer housing at a first end of the main body;
   positioning an internal sealing member at a second end of the main body; and
   compressing the internal sealing member longitudinally between the second end of the main body and a compression member to create an environmental seal between the cable and the main body of the ruggedized connector.

2. The method of claim 1, further comprising the step of curing an adhesive in the connection portion to secure the bare glass portion.

3. The method of claim 1, further comprising the step of activating a mechanical splice device disposed within the connection portion to secure the bare glass portion.

4. The method of claim 1, further comprising the step of screwing the compression member onto the second end of the main body to compress the internal sealing member.

5. An environmentally sealing optical fiber connector, the connector comprising:
   a main body having an interior passageway extending from a first end to a second end of the main body;
   an outer housing integrally formed on the first end of the main body, wherein the outer housing has an external shape mateable with a standard format optical coupling;
   a compression member attachable to the second end of the main body;
   an optical connection portion secured in the outer housing, wherein the interior passageway is configured to allow the optical connection portion to be slid through the main body from the second end to the first end; and
   an internal sealing member that is compressed longitudinally between the compression member and the main body when the compression member is attached to the second end of the main body to provide an environmental seal between the main body and an optical fiber cable onto which the optical fiber connector is mounted.

6. The connector of claim 5, wherein the outer housing is shaped to mate with an SC-format optical coupling.

7. The connector of claim 5, further comprising a port connection mechanism.

8. The connector of claim 7, wherein the port connection mechanism comprises a spring clip.

9. The connector of claim 7, wherein the port connection mechanism comprises a plurality of protrusions extending from an exterior surface of the main body and a release lever.

10. The connector of claim 5, wherein the main body comprises at least two body portions.

11. The connector of claim 10, wherein the main body comprises a first body portion housing the connector portion and a second body portion to grip a sheath of the optical fiber cable passing therethrough.

12. The connector of claim 10, wherein the main body comprises a first body portion housing the connector portion and a second body portion to grip the sheath of an optical fiber cable passing therethrough and an intermediate body portion that provides an environmental seal between the cable and the connector.

13. The connector of claim 5, wherein the main body comprises at least two body portions and wherein the connector further comprising an optical fiber cable terminated by the optical fiber cable connector where in the optical fiber cable includes a plurality of first strength members secured within the optical connector portion and a plurality of second strength members, wherein the second strength members are secured between two of the at least two body portions.

14. The connector of claim 5, wherein the internal sealing member comprises an elastomeric portion and a rigid portion.

* * * * *

UNITED STATES PATENT AND TRADEMARK OFFICE
CERTIFICATE OF CORRECTION

PATENT NO. : 9,638,871 B2  
APPLICATION NO. : 15/004010  
DATED : May 2, 2017  
INVENTOR(S) : Christine Bund Page 1 of 1

It is certified that error appears in the above-identified patent and that said Letters Patent is hereby corrected as shown below:

In the Specification

Column 1,
Line 8, delete "14/3,690,559" and insert in place therefor -- 14/369,055 --.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*